United States Patent
Lee et al.

(10) Patent No.: US 10,255,689 B2
(45) Date of Patent: Apr. 9, 2019

(54) ELECTRONIC DEVICE FOR SELECTING IMAGE PROCESSING TECHNIQUE BASED ON SHAPE AND OPERATING METHOD THEREOF

(71) Applicant: SAMSUNG ELECTRONICS CO., LTD., Suwon-si, Gyeonggi-do (KR)

(72) Inventors: Wooyong Lee, Hwaseong-si (KR); Gyubong Lee, Suwon-si (KR); Hyoung Jin Yoo, Suwon-si (KR); Inpyo Lee, Bucheon-si (KR); Jonghoon Won, Suwon-si (KR)

(73) Assignee: Samsung Electronics, Co., Ltd., Suwon-si, Gyeonggi-do (KR)

( * ) Notice: Subject to any disclaimer, the term of this patent is extended or adjusted under 35 U.S.C. 154(b) by 17 days.

(21) Appl. No.: 15/435,902

(22) Filed: Feb. 17, 2017

(65) Prior Publication Data

US 2017/0243367 A1    Aug. 24, 2017

(30) Foreign Application Priority Data

Feb. 19, 2016    (KR) .................. 10-2016-0020009

(51) Int. Cl.
*H04N 5/225*    (2006.01)
*G06T 7/70*    (2017.01)
(Continued)

(52) U.S. Cl.
CPC .................. *G06T 7/70* (2017.01); *G06T 5/20* (2013.01); *G06T 11/60* (2013.01); *H04N 5/2226* (2013.01); *H04N 5/2257* (2013.01); *H04N 5/23212* (2013.01); *H04N 5/23229* (2013.01); *H04N 5/23293* (2013.01); *H04N 5/2621* (2013.01); *H04N 5/3696* (2013.01)

(58) Field of Classification Search
CPC ........................................ G06T 7/70
See application file for complete search history.

(56) References Cited

U.S. PATENT DOCUMENTS

2011/0148868 A1    6/2011    Chang et al.
2013/0050429 A1    2/2013    Suzuki et al.
(Continued)

FOREIGN PATENT DOCUMENTS

JP    2011239267 A    11/2011
JP    2012109899 A    6/2012
(Continued)

OTHER PUBLICATIONS

Extended European Search Report issued in Appln. No. 17156597.1 dated Jun. 20, 2017.

(Continued)

*Primary Examiner* — Gary C Vieaux
(74) *Attorney, Agent, or Firm* — Nixon & Vanderhye P.C.

(57) ABSTRACT

An electronic device and an operating method thereof are provided. The electronic device includes a camera module, a memory module, and a processor operatively coupled with the camera module and the memory module. The processor acquires an image through the camera module, extracts distance information based on the acquired image, determines an image processing technique for an object based on the extracted distance information, applies the determined image processing technique to the acquired image to generate a new image, and displays the new image.

20 Claims, 29 Drawing Sheets

(51) Int. Cl.
*G06T 5/20* (2006.01)
*G06T 11/60* (2006.01)
*H04N 5/232* (2006.01)
*H04N 5/222* (2006.01)
*H04N 5/262* (2006.01)
*H04N 5/369* (2011.01)

(56) References Cited

U.S. PATENT DOCUMENTS

| | | |
|---|---|---|
| 2013/0194290 A1 | 8/2013 | Hamano |
| 2015/0187083 A1 | 7/2015 | Yoon et al. |
| 2017/0070664 A1 | 3/2017 | Yoon et al. |

FOREIGN PATENT DOCUMENTS

| | | |
|---|---|---|
| KR | 10-2011-0071213 | 6/2011 |
| KR | 20120048192 A | 5/2012 |
| KR | 20150097987 A | 8/2015 |
| WO | 2015115771 A1 | 8/2015 |

OTHER PUBLICATIONS

International Search Report issued in PCT/KR2017/001757 dated May 23, 2017.
Written Opinion of the International Searching Authority issued in PCT/KR2017/001757 dated May 23, 2017.

Linear

Circular

Lighting

Macro

Selective Focus

| R | R | G | G | R | R | G | G |
|---|---|---|---|---|---|---|---|
| G | G | B | B | G | G | B | B |
| R | R | G | G | R | R | G | G |
| G | G | B | B | G | G | B | B |

FIG.10A

| R | R | G | G | R | R | G | G |
|---|---|---|---|---|---|---|---|
| R | R | G | G | R | R | G | G |
| G | G | B | B | G | G | B | B |
| G | G | B | B | G | G | B | B |
| R | R | G | G | R | R | G | G |
| R | R | G | G | R | R | G | G |
| G | G | B | B | G | G | B | B |
| G | G | B | B | G | G | B | B |

FIG.10B

ELECTRONIC DEVICE FOR SELECTING IMAGE PROCESSING TECHNIQUE BASED ON SHAPE AND OPERATING METHOD THEREOF

CROSS-REFERENCE TO RELATED APPLICATION

This application is based on and claims priority under 35 U.S.C. § 119 to a Korean Patent Application filed in the Korean Intellectual Property Office on Feb. 19, 2016 and assigned Serial No. 10-2016-0020009, the disclosure of which is incorporated by reference herein in its entirety.

BACKGROUND

1. Field of the Disclosure

The present disclosure relates generally to an electronic device capable of processing an image, and an operating method thereof.

2. Description of Related Art

With the growth of digital technologies, electronic devices can be used in various types such as mobile communication terminals, smart phones, tablet Personal Computers (PCs), Personal Digital Assistants (PDAs), electronic organizers, notebook computers, wearable devices, etc. The electronic devices are coming to a mobile convergence level encompassing even functions of other devices. The electronic device can include a camera module. The electronic device can photograph an object image through the camera module, and can store or transmit the photographed image to an external another electronic device.

When processing a photographed image, the electronic device could set an image processing function that is in advance prepared through a menu, etc., and apply the set image processing function, thereby process the image acquired through the camera module. For example, in case where the electronic device uses an image filter, a user can previously set the image filter, and the electronic device could apply a function of the set image filter to the image acquired through the camera module, thereby processing the image.

SUMMARY

An electronic device according to various example embodiments of the present disclosure can provide an apparatus and method capable of extracting distance information from image data acquired, automatically determining an image processing technique based on the extracted distance information, and applying the determined image processing technique to the acquired image, thereby generating a new image.

An electronic device according to various example embodiments of the present disclosure can provide an apparatus and method capable of extracting distance information from image data acquired through an image sensor, automatically determining an image filter based on the extracted distance information, and applying the determined image filter to the acquired image, thereby generating a new image.

An electronic device according to various example embodiments of the present disclosure can provide an apparatus and method capable of extracting a contour line of image data generated through an image sensor, to recognize configuration information of an object, setting an image filter based on the configuration information, and applying the image filter to the image data, thereby generating a new image.

An electronic device according to various example embodiments of the present disclosure can include a camera module, a memory module, and a processor operatively coupled with the camera module and the memory module. The processor can acquire image data through the camera module, extract distance information based on the acquired image data, determine an image processing technique for an object based on the extracted distance information, apply the determined image processing technique to the acquired image data, and display the applied image data.

A method for operating in an electronic device according to various example embodiments of the present disclosure can include the operations of acquiring image data through an image sensor, extracting distance information from the acquired image data, determining an image processing technique for an object based on the extracted distance information, applying the determined image processing technique to the acquired image data, to generate a new image, and displaying the new image.

BRIEF DESCRIPTION OF THE DRAWINGS

These and other aspects, features and attendant advantages of the present disclosure will be more readily appreciated and understood from the following detailed description, taken in conjunction with the accompanying drawings, in which like reference numerals refer to like elements, and wherein:

FIG. 10A and FIG. 10B are diagrams illustrating examples of a unit pixel and sub pixels of an image sensor according to various example embodiments of the present disclosure;

DETAILED DESCRIPTION

Figure 1:
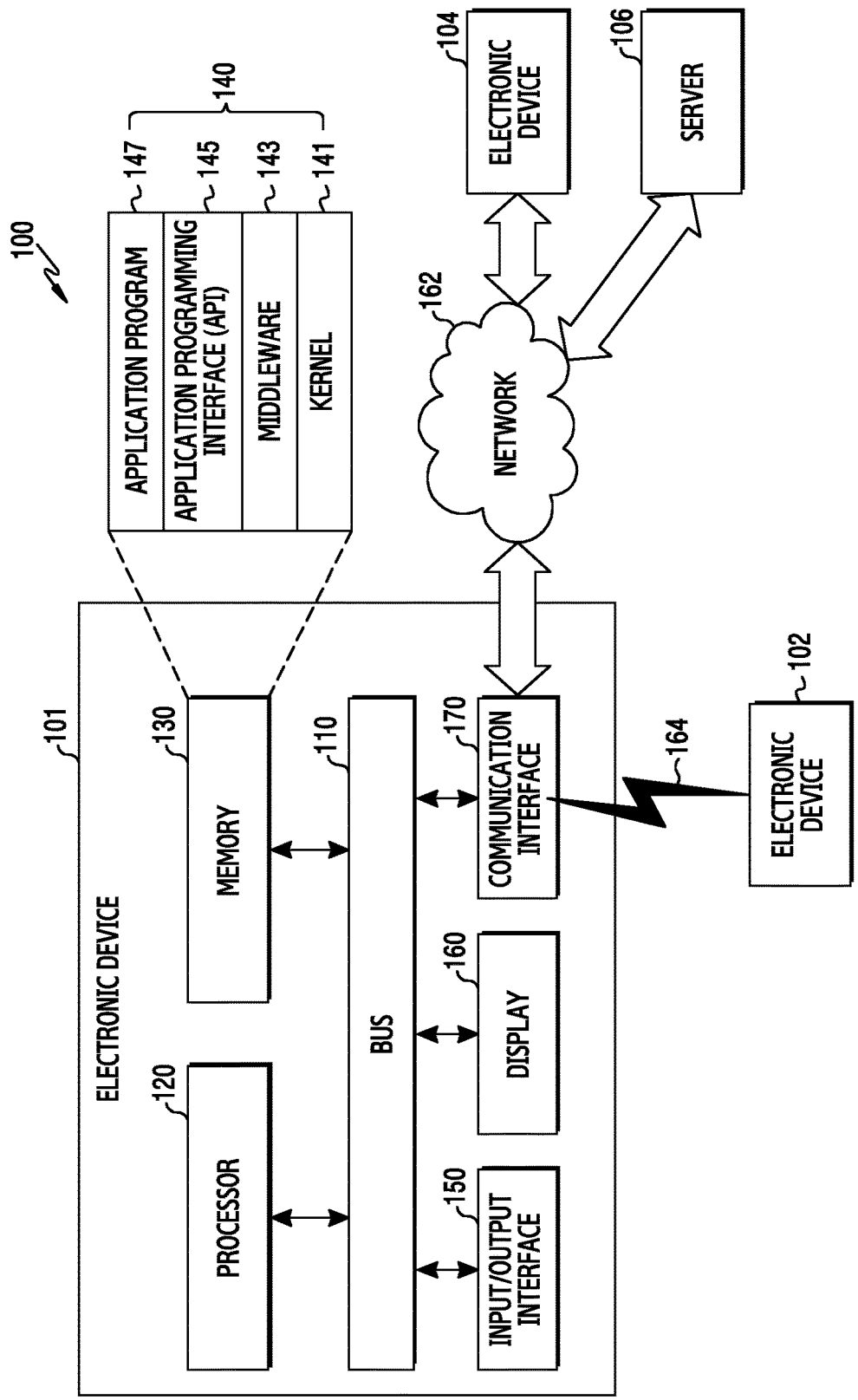
FIG. 1 is a diagram illustrating an example network environment system according to various example embodiments.

Various example embodiments of the present disclosure are described in greater detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure. The terms used herein are defined in consideration of functions of the present disclosure and may vary depending on a user's or an operator's intension and usage. Therefore, the terms used herein should be understood based on the descriptions made herein. It is to be understood that the singular forms "a," "an," and "the" include plural referents unless the context clearly dictates otherwise. In the present disclosure, an expression such as "A or B," "at least one of A and B," or "one or more of A and B" may include all possible combinations of the listed items. Expressions such as "first," "second," "primarily," or "secondary," as used herein, may represent various elements regardless of order and/or importance and do not limit corresponding elements. The expressions may be used for distinguishing one element from another element. When it is described that an element (such as a first element) is "(operatively or communicatively) coupled" to or "connected" to another element (such as a second element), the element can be directly connected to the other element or can be connected through another element (such as a third element).

An expression "configured to (or set)" used in the present disclosure may be used interchangeably with, for example, "suitable for," "having the capacity to," "designed to," "adapted to," "made to," or "capable of" according to a situation. A term "configured to (or set)" does not only refer to "specifically designed to" by hardware. In some situations, the expression "apparatus configured to" may refer to a situation in which the apparatus "can" operate together with another apparatus or component. For example, a phrase "a processor configured (or set) to perform A, B, and C" may be a dedicated processor, a generic-purpose processor (such as a Central Processing Unit (CPU) or an application processor) that can perform a corresponding operation by executing at least one software program stored at an exclusive processor (such as an embedded processor) for performing a corresponding operation or at a memory device.

An electronic device according to various example embodiments of the present disclosure, may be embodied as, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), an MPEG 3 (MP3) player, a medical equipment, a camera, and a wearable device, or the like, but is not limited thereto. The wearable device can include at least one of an accessory type (e.g., a watch, a ring, a bracelet, an ankle bracelet, a necklace, glasses, a contact lens, or a Head-Mounted-Device (HMD)), a fabric or clothing embedded type (e.g., electronic garments), a body attachable type (e.g., a skin pad or a tattoo), and an implantable circuit, or the like, but is not limited thereto. The electronic device may be embodied as at least one of, for example, a television, a Digital Versatile Disc (DVD) player, an audio device, a refrigerator, an air-conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, and an electronic frame, or the like, but is not limited thereto.

In another example embodiment, the electronic device may be embodied as at least one of various medical devices (such as, various portable medical measuring devices (a blood sugar measuring device, a heartbeat measuring device, a blood pressure measuring device, or a body temperature measuring device), a Magnetic Resonance Angiography (MRA) device, a Magnetic Resonance Imaging (MRI) device, a Computed Tomography (CT) device, a scanning machine, and an ultrasonic wave device), a navigation device, a Global Navigation Satellite System (GNSS), an Event Data Recorder (EDR), a Flight Data Recorder (FDR), a vehicle infotainment device, electronic equipment for ship (such as, a navigation device for ship and gyro compass), avionics, a security device, a head unit for a vehicle, an industrial or home robot, a drone, an Automated Teller Machine (ATM) of a financial institution, a Point Of Sales (POS) device of a store, and an Internet of Things (IoT) device (e.g., a light bulb, various sensors, a sprinkler device, a fire alarm, a thermostat, a street light, a toaster, sports equipment, a hot water tank, a heater, and a boiler), or the like, but is not limited thereto.

According to an example embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device), or the like, but is not limited thereto. An electronic device, according to an example embodiment, can be a flexible electronic device or a combination of two or more of the foregoing various devices. An electronic device, according to an example embodiment of the present disclosure, is not limited to the foregoing devices may be embodied as a newly developed electronic device. The term "user", as used herein, can refer to a person using an electronic device or a device using an electronic device (e.g., an artificial intelligence electronic device).

Referring initially to FIG. 1, an electronic device 101 resides in a network environment 100. The electronic device 101 can include a bus 110, a processor (e.g., including processing circuitry) 120, a memory 130, an input/output interface (e.g., including input/output circuitry) 150, a display 160, and a communication interface (e.g., including interface circuitry) 170. The electronic device 101 may be provided without at least one of the components, or may include at least one additional component.

The bus 110 can include a circuit for connecting the components 120 through 170 and delivering communication signals (e.g., control messages or data) therebetween.

The processor 120 can include various processing circuitry, such as, for example, and without limitation, one or more of a dedicated processor, a CPU, an application processor, and a Communication Processor (CP), or the like. The processor 120, for example, can perform an operation or data processing with respect to control and/or communication of at least another component of the electronic device 101.

The memory 130 can include a volatile and/or nonvolatile memory. The memory 130, for example, can store commands or data relating to at least another component of the electronic device 101. According to an embodiment, the memory 130 can store software and/or a program 140. The program 140 can include, for example, a kernel 141, middleware 143, an Application Programming Interface (API) 145, and/or an application program (or "application") 147. At least part of the kernel 141, the middleware 143, or the API 145 can be referred to as an Operating System (OS). The kernel 141 can control or manage system resources (e.g., the bus 110, the processor 120, or the memory 130) used for performing operations or functions implemented by the other programs (e.g., the middleware 143, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve an intermediary role for exchanging data between the API 145 or the application program 147 and the kernel 141 through communication. Additionally, the middleware 143 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application 147 controls a function provided from the kernel 141 or the middleware 143, can include, for example, at least one interface or function (e.g., an instruction) for file control, window control, image processing, or character control. The input/output interface 150, for example, can deliver commands or data inputted from a user or another external device to other component(s) of the electronic device 101, or output commands or data inputted from the other component (s) of the electronic device 101 to the user or another external device.

The display 160, for example, can include a Liquid Crystal Display (LCD), a Light Emitting Diode (LED) display, an Organic Light Emitting Diode (OLED) display, a MicroElectroMechanical Systems (MEMS) display, or an electronic paper display, or the like, but is not limited thereto. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part.

The communication interface 170, for example, can set a communication between the electronic device 101 and an external device (e.g., a first external electronic device 102, a second external electronic device 104, or a server 106). For example, the communication interface 170 can communicate with the external device (e.g., the second external electronic device 104 or the server 106) over a network 162 through wireless communication or wired communication.

The wireless communication, for example, can include cellular communication using at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM). The wireless communication 164 can include, for example, at least one of Wireless Fidelity (WiFi), Bluetooth, Bluetooth Low Energy (BLE), Zigbee, Near Field Communication (NFC), magnetic secure transmission, Radio Frequency (RF), and Body Area Network (BAN). The wireless communication can include GNSS. The GNSS can include, for example, Global Positioning System (GPS), Global Navigation Satellite System (GLONASS), Beidou navigation satellite system (Beidou), or Galileo (the European global satellite-based navigation system). Hereafter, the GPS can be interchangeably used with the GNSS. The wired communication, for example, can include at least one of Universal Serial Bus (USB), High Definition Multimedia Interface (HDMI), Recommended Standard 232 (RS-232), power line communications, and Plain Old Telephone Service (POTS). The network 162 can include a telecommunications network, for example, at least one of computer network (e.g., LAN or WAN), Internet, and telephone network.

Each of the first and second external electronic devices 102 and 104 can be of the same as or of a different type from that of the electronic device 101. According to embodiments of the present disclosure, all or part of operations executed in the electronic device 101 can be executed by another electronic device or a plurality of electronic devices (e.g., the electronic device 102 or 104, or the server 106). To perform a function or service automatically or by request, instead of performing the function or the service by the electronic device 101, the electronic device 101 can request at least part of a function relating thereto from another device (e.g., the electronic device 102 or 104, or the server 106). The other electronic device (e.g., the electronic device 102 or 104, or the server 106) can perform the requested function or an additional function and send its result to the electronic device 101. The electronic device 101 can provide the requested function or service by processing the received result. In doing so, for example, cloud computing, distributed computing, or client-server computing techniques can be used.

Figure 2:
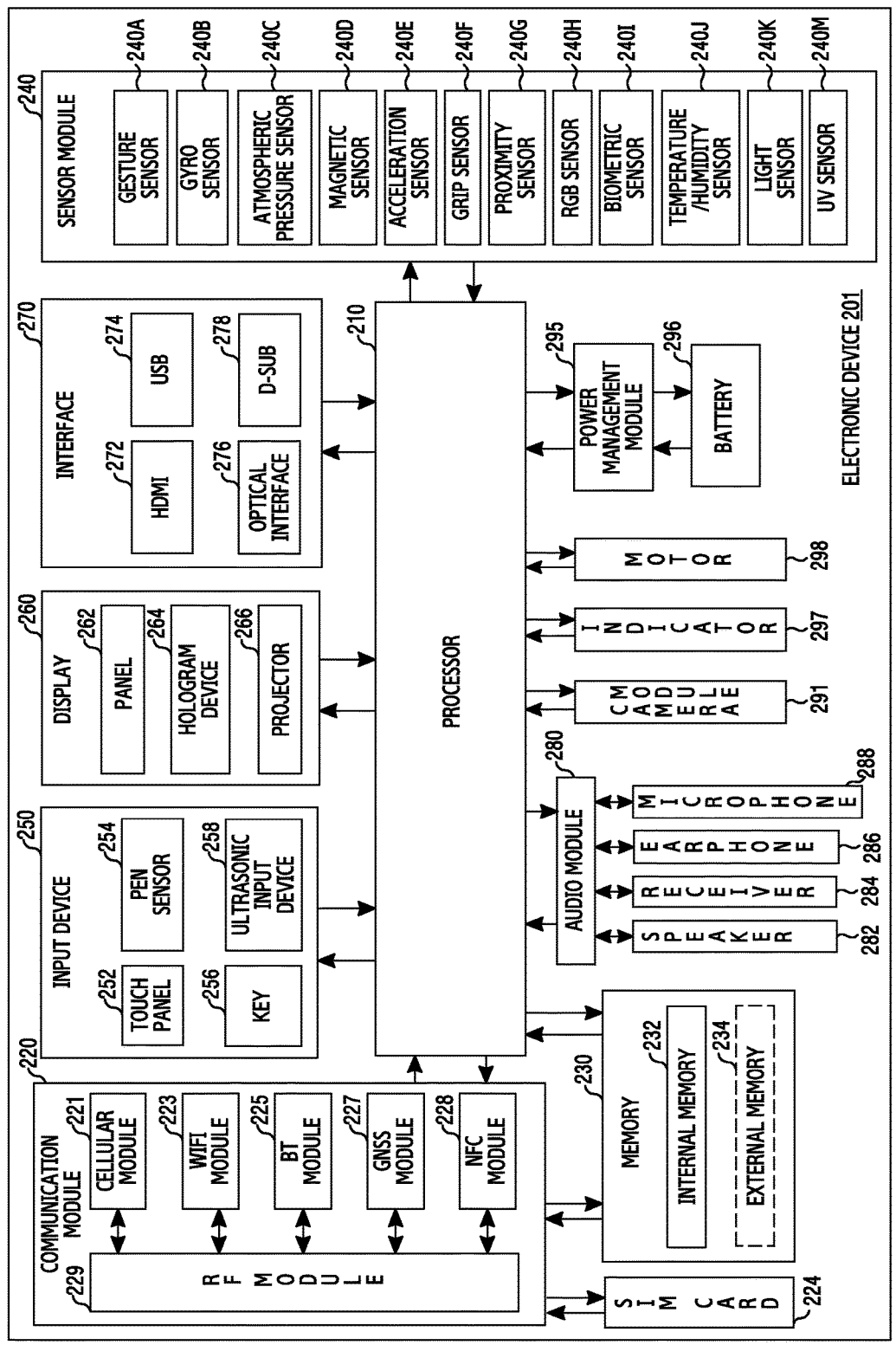
FIG. 2 is a block diagram illustrating an example electronic device according to various example embodiments.

FIG. 2 is a block diagram illustrating an example electronic device 201 according to an example embodiment of the present disclosure.

The electronic device 201, for example, can include all or part of the above-described electronic device 101 of FIG. 1. The electronic device 201 includes one or more processors (e.g., an AP) (e.g., including processing circuitry) 210, a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210, for example, may include various processing circuitry and can control a plurality of hardware or software components connected to the processor 210, and also can perform various data processing and operations by executing an OS or an application program. The processor 210 can be implemented with a System on Chip (SoC), for example. The processor 210 can further include a Graphic Processing Unit (GPU) and/or an image signal processor. The processor 210 may include at least part (e.g., a cellular module 221) of the components illustrated in FIG. 2. The processor 210 can load commands or data received from at least one other component (e.g., a nonvolatile memory) into a volatile memory, process them, and store various data in the nonvolatile memory.

The communication module 220 can have the same or similar configuration to the communication interface 170 of FIG. 1. The communication module 220 may include various communication circuitry, such as, for example, and without limitation, the cellular module 221, a WiFi module 223, a Bluetooth (BT) module 225, a GNSS module 227, an NFC module 228, and an RF module 229. The cellular module 221, for example, can provide voice call, video call, Short Message Service (SMS), or Internet service through a communication network. The cellular module 221 can identify and authenticate the electronic device 201 in a communication network by using the SIM (e.g., a SIM card) 224. The cellular module 221 can perform at least part of a function that the processor 210 provides. The cellular module 221 can further include a CP. At least some (e.g., two or more) of the cellular module 221, the WiFi module 223, the BT module 225, the GNSS module 227, and the NFC module 228 can be included in one Integrated Circuit (IC) or an IC package. The RF module 229, for example, can transmit/receive a communication signal (e.g., an RF signal). The RF module 229, for example, can include a transceiver, a Power Amp Module (PAM), a frequency filter, a Low Noise Amplifier (LNA), or an antenna. According to another embodiment, at least one of the cellular module 221, the WiFi module 223, the BT module 225, the GNSS module 227, and the NFC module 228 can transmit/receive an RF signal through an additional RF module. The SIM 224, for example, can include a card including a SIM or an embedded SIM, and also can contain unique identification information (e.g., an Integrated Circuit Card Identifier (ICCID)) or subscriber information (e.g., an International Mobile Subscriber Identity (IMSI)).

The memory 230 (e.g., the memory 130) can include at least one of an internal memory 232 and/or an external memory 234. The internal memory 232 can include at least one of, for example, a volatile memory (e.g., Dynamic RAM (DRAM), Static RAM (SRAM), or Synchronous Dynamic RAM (SDRAM)), and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory, hard drive, and solid state drive (SSD)). The external memory 234 can include flash drive, for example, Compact Flash (CF), Secure Digital (SD), micro SD, mini SD, extreme digital (xD), Multi-Media Card (MMC), or memory stick. The external memory 234 can be functionally or physically connected to the electronic device 201 through various interfaces.

The sensor module 240 can, for example, measure physical quantities or detect an operating state of the electronic device 201, and thus convert the measured or detected information into electrical signals. The sensor module 240 can include at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (e.g., a Red, Green, Blue (RGB) sensor), a biometric sensor 240I, a temperature/humidity sensor 240J, an illumination (e.g., light) sensor 240K, and an Ultra Violet (UV) sensor 240M. Additionally or alternately, the sensor module 240 can include an E-nose sensor, an Electromyography (EMG) sensor, an Electroencephalogram (EEG) sensor, an Electrocardiogram (ECG) sensor, an InfraRed (IR) sensor, an iris sensor, and/or a fingerprint sensor. The sensor module 240 can further include a control circuit for controlling at least one sensor therein. The electronic device, as part of the processor 210 or individually, can further include a processor configured to control the sensor module 240 and thus control the sensor module 240 while the processor 210 is sleeping.

The input device 250 can include various input circuitry, such as, for example, and without limitation, at least one of a touch panel 252, a (digital) pen sensor 254, a key 256, and an ultrasonic input device 258. The touch panel 252 can use at least one of, for example, capacitive, resistive, infrared, and ultrasonic methods. Additionally, the touch panel 252 can further include a control circuit. The touch panel 252 can further include a tactile layer to provide a tactile response to a user. The (digital) pen sensor 254 can include, for example, part of a touch panel or a sheet for recognition. The key 256 can include, for example, a physical button, a touch key, an optical key, or a keypad. The ultrasonic input device 258 can detect ultrasonic waves from an input means through a microphone 288 and check data corresponding to the detected ultrasonic waves.

The display 260 (e.g., the display 160) can include at least one of a panel 262, a hologram device 264, a projector 266, and/or a control circuit for controlling them. The panel 262 can be implemented to be flexible, transparent, or wearable, for example. The panel 262 and the touch panel 252 can be configured with one or more modules. The panel 262 can include a pressure sensor (or a force sensor) for measuring a pressure of the user touch. The pressure sensor can be integrated with the touch panel 252, or include one or more sensors separately from the touch panel 252. The hologram device 264 can show three-dimensional images in the air by using the interference of light. The projector 266 can display an image by projecting light on a screen. The screen, for example, can be placed inside or outside the electronic device 201.

The interface 270 can include various interface circuitry, such as, for example, and without limitation, an HDMI 272, a USB 274, an optical interface 276, or a D-subminiature (D-sub) 278. The interface 270 can be included in, for example, the communication interface 170 of FIG. 1. Additionally or alternately, the interface 270 can include a Mobile High-Definition Link (MHL) interface, a SD card/MMC interface, or an Infrared Data Association (IrDA) standard interface.

The audio module 280, for example, can convert sounds into electrical signals and convert electrical signals into sounds. At least some components of the audio module 280 can be included in, for example, the input/output interface 150 of FIG. 1. The audio module 280 can process sound information input or output through a speaker 282, a receiver 284, an earphone 286, or the microphone 288. The camera module 291, as a device for capturing still images and videos, can include one or more image sensors (e.g., a front sensor or a rear sensor), a lens, an Image Signal Processor (ISP), or a flash (e.g., an LED or a xenon lamp). The power management module 295, for example, can manage the power of the electronic device 201. According to an embodiment of the present disclosure, the power management module 295 can include a Power Management IC (PMIC), a charger IC, or a battery or fuel gauge, for example. The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier circuit. The battery gauge can measure the remaining capacity of the battery 296, or a voltage, current, or temperature of the battery 296 during charging. The battery 296 can include, for example, a rechargeable battery and/or a solar battery.

The indicator 297 can display a specific state of the electronic device 201 or part thereof (e.g., the processor 210), for example, a booting state, a message state, or a charging state. The motor 298 can convert electrical signals into mechanical vibration and generate a vibration or haptic effect. The electronic device 201 can include a mobile TV supporting device (e.g., a GPU) for processing media data according to standards such as Digital Multimedia Broadcasting (DMB), Digital Video Broadcasting (DVB), or MediaFLOW™. Each of the above-described components of the electronic device can be configured with at least one component and the name of a corresponding component can vary according to the kind of an electronic device. According to an embodiment of the present disclosure, an electronic device (e.g., the electronic device 201) can be configured to include at least one of the above-described components or an additional component, or to not include some of the above-described components. Additionally, some of components in an electronic device are configured as one entity, so that functions of previous corresponding components are performed identically.

Figure 3:
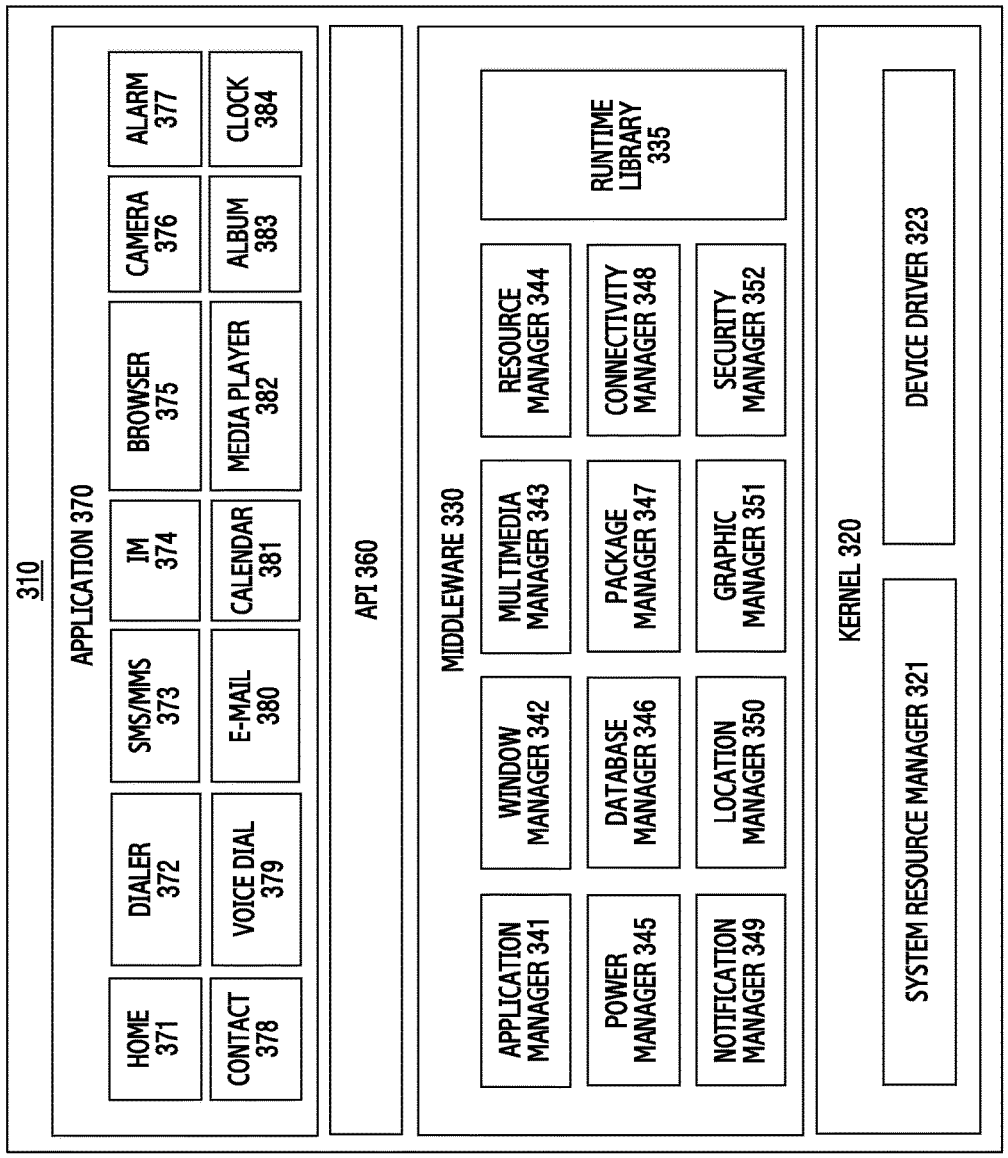
FIG. 3 is a block diagram illustrating an example program module according to various example embodiments.

FIG. 3 is a block diagram illustrating an example program module according to an embodiment of the present disclosure. A program module 310 (e.g., the program 140) can include an OS for controlling a resource relating to an electronic device (e.g., the electronic device 101) and/or various applications (e.g., the application program 147) running on the OS. The OS can include, for example, Android™, iOS™, Window™, Symbian™, Tizen™, or Bala™. Referring to FIG. 3, the program module 310 can include a kernel 320 (e.g., the kernel 141), a middleware 330 (e.g., the middleware 143), an API 360 (e.g., the API 145), and/or an application 370 (e.g., the application program 147). At least part of the program module 310 can be preloaded on an electronic device or can be downloaded from an external electronic device (e.g., the electronic device 102, 104, or the server 106).

The kernel 320 includes, for example, at least one of a system resource manager 321 and/or a device driver 323. The system resource manager 321 can control, allocate, or retrieve a system resource. According to an embodiment, the system resource manager 321 can include a process management unit, a memory management unit, or a file system management unit. The device driver 323 can include, for example, a display driver, a camera driver, a Bluetooth driver, a sharing memory driver, a USB driver, a keypad driver, a WiFi driver, an audio driver, or an Inter-Process Communication (IPC) driver.

The middleware 330, for example, can provide a function commonly required by the application 370, or can provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include, for example, a library module used by a complier to add a new function through a programming language while the application 370 is running. The runtime library 335 can manage input/output, manage memory, or arithmetic function processing. The application manager 341, for example, can manage the life cycle of the applications 370. The window manager 342 can manage a GUI resource used in a screen. The multimedia manager 343 can recognize a format for playing various media files and encode or decode a media file by using the codec in a corresponding format. The resource manager 344 can manage a source code of the application 3740 or a memory space. The power manager 345 can manage the capacity or power of the battery and provide power information for an operation of the electronic device. The power manager 345 can operate together with a Basic Input/Output System (BIOS). The database manager 346 can create, search, or modify a database used in the application 370. The package manager 347 can manage installation or updating of an application distributed in a package file format.

The connectivity manger 348 can manage, for example, a wireless connection. The notification manager 349 can provide an event, such as incoming messages, appointments, and proximity alerts, to the user. The location manager 350 can manage location information of an electronic device. The graphic manager 351 can manage a graphic effect to be provided to the user or a user interface relating thereto. The security manager 352 can provide, for example, system security or user authentication. The middleware 330 can include a telephony manager for managing a voice or video call function of the electronic device, or a middleware module for combining various functions of the above-described components. The middleware 330 can provide a module specialized for each type of OS. The middleware 330 can dynamically delete part of the existing components or add new components. The API 360, as a set of API programming functions, can be provided as another configuration according to the OS. For example, Android or iSO can provide one API set for each platform, and Tizen can provide two or more API sets for each platform.

The application 370 can include at least one of a home 371, a dialer 372, an SMS/Multimedia Messaging System (MIMS) 373, an Instant Message (IM) 374, a browser 375, a camera 376, an alarm 377, a contact 378, a voice dial 379, an e-mail 380, a calendar 381, a media player 382, an album 383, a clock 384, health care (e.g., measure an exercise amount or blood sugar level), or environmental information (e.g., air pressure, humidity, or temperature information) provision application. The application 370 can include an information exchange application for supporting information exchange between the electronic device and an external electronic device. The information exchange application can include, for example, a notification relay application for relaying specific information to the external device or a device management application for managing the external electronic device. For example, the notification relay application can relay notification information from another application of the electronic device to an external electronic device, or receive and forward notification information from an external electronic device to the user. The device management application, for example, can install, delete, or update a function (e.g., turn-on/turn off of the external electronic device itself (or some components) or display brightness (or resolution) adjustment) of an external electronic device communicating with the electronic device, or an application operating in the external electronic device. The application 370 can include a specified application (e.g., a health care application of a mobile medical device) according to a property of the external electronic device. The application 370 can include an application received from an external electronic device. At least part of the program module 310 can be implemented (e.g., executed) with software, firmware, hardware (e.g., the processor 210), or a combination of at least two of them, and include a module, a program, a routine, a set of instructions, or a process for executing one or more functions.

A term "module" used in the present disclosure includes a unit including hardware, software, or firmware, or any combination thereof, and may be interchangeably used with a term such as a unit, a logic, a logical block, a component, a circuit, and the like. The "module" may be an integrally constructed component or a minimum unit or one part thereof for performing one or more functions. The "module" may be mechanically or electrically implemented, and may include, for example, and without limitation, a dedicated process, a CPU, an Application-Specific Integrated Circuit (ASIC) chip, a Field-Programmable Gate Arrays (FPGAs), or a programmable-logic device, which is known or to be developed to perform certain operations.

At least one part of an apparatus (e.g., modules or functions thereof) or method (e.g., operations) according to various example embodiments may be implemented with an instruction stored in a computer-readable storage media (e.g., the memory 130). If the instruction is executed by one or more processors (e.g., the processor 120), the one or more processors may perform a function corresponding to the instruction. The computer-readable storage media may include a hard disk, a floppy disk, magnetic media (e.g., a magnetic tape), optical media (e.g., a Compact Disc-ROM (CD-ROM), a Digital Versatile Disc (DVD), magnetic-optic media (e.g., a floptical disk)), an internal memory, or the like. The instruction may include a code created by a compiler or a code executable by an interpreter.

The module or programming module according to various example embodiments may further include at least one or more elements among the aforementioned elements, or may omit some of them, or may further include additional other elements. Operations performed by a module, programming module, or other elements may be executed in a sequential, parallel, repetitive, or heuristic manner. In addition, some of the operations may be executed in a different order or may be omitted, or other operations may be added.

In various example embodiments of the present disclosure, the term "image information" may, for example, be used as the term including image data output from an image sensor and distance information between an electronic device and an object. The "image data" may include, for example, a color image that is generated in the image sensor. The "distance information" may include, for example, distance information between the object and the electronic device, which is generated in the image sensor. The distance information can be generated, for example, through phase difference information between pixels of the image sensor. For example, a 2 Photo Detector (2-PD) image sensor or 4-PD image sensor can determine the distance information through a phase difference between sub pixels. The image sensor including a top surface phase difference sensor can determine the distance information based on an output of the top surface phase difference sensor. The "image informa-tion" may include, for example, "three-Dimensional (3D) information". "Configuration information" may include, for example, information that can be estimated based on a depth map of an object included in an image. The configuration information can include a range of the object and/or object position information within the image. The configuration information can further include photographing posture information of the electronic device. A "new image" may include, for example, an image that is generated by applying an image processing technique, which may be automatically set in the electronic device, to an acquired image. The image processing technique may include an image filtering method, for example.

Figure 4:
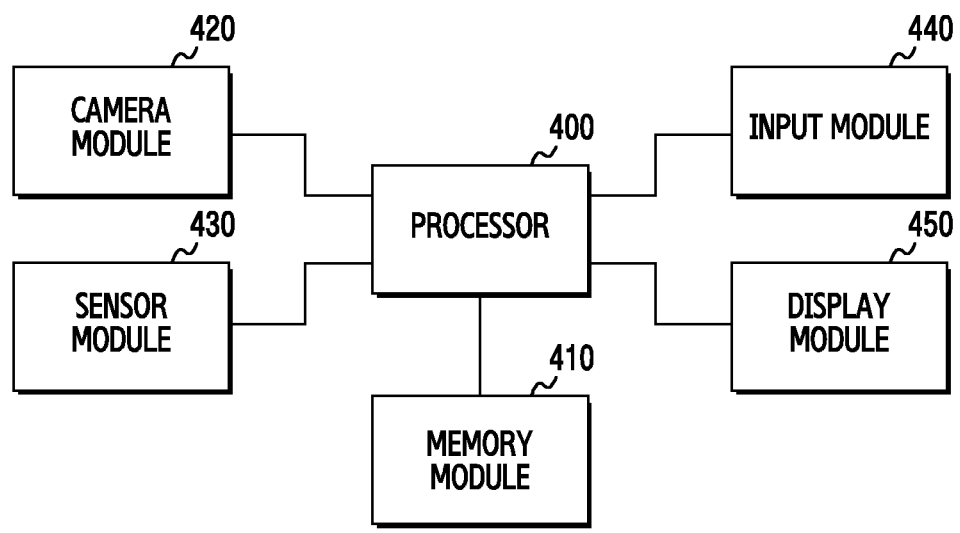
FIG. 4 is a block diagram illustrating an example electronic device according to various example embodiments of the present disclosure.

FIG. 4 is a block diagram illustrating an example electronic device according to various example embodiments of the present disclosure.

Referring to FIG. 4, the electronic device can include a processor (e.g., including processing circuitry) 400, a memory module 410, a camera module (e.g., including a camera and associated image obtaining and processing circuitry) 420, a sensor module 430, an input module (e.g., including input circuitry) 440, and/or a display module 450. In some example embodiment, the electronic device can omit at least one of the elements or additionally include another element.

The processor 400 may include various processing circuitry and can execute operation or data processing according to control and/or application execution of at least one another element of the electronic device. The processor 400 can analyze image data acquired in a photographing mode, to extract distance information, and process an image based on the extracted distance information. The processor 400 can set a photographing condition. The processor 400 can recognize configuration information of objects within image data based on the image data that is acquired based on the photographing condition, and set an image processing technique (for example, image filter) based on the configuration information of the object, and apply the set image processing technique to the acquired image data, thereby generating a new image.

The memory module 410 can include a volatile and/or non-volatile memory. The memory module 410 can store a command or data related to at least another element of the electronic device. The memory module 410 can store software and/or program. The program can, for example, include a kernel, a middleware, an Application Programming Interface (API), an application program (or "application"), etc. At least some of the kernel, the middleware, or the API can be called an Operating System (OS). The memory module 410 according to various example embodiments of the present disclosure can store image filters.

The camera module 420 can include various image receiving and processing circuitry and element, such as, for example, and without limitation, a lens and an image sensor, and can acquire an image including an object. The camera module 420 can be the camera module 291 of FIG. 2. The camera module 420 can be called an imaging device as well. The image sensor can generate image data. The image data can include a signal for extracting distance information (e.g., depth information). For example, the image data can include pixel image data and a signal for extracting (determining) distance information. The image sensor can have an image sensor construction (for example, 2-PD image sensor, 4-PD image sensor, etc.) in which one unit pixel includes a plurality of sub pixels. The image sensor can have a construction that includes a pixel sensor and top surface phase difference sensors. The image sensor can be a Time Of Flight (TOF) image sensor or structured-light image sensor that can extract distance information between the electronic device and the object. The image sensor can include an IR or ultrasonic measurement device, etc., and output a signal for extracting distance information of the object.

The sensor module 430 can include various sensors capable of sensing information of a motion of the electronic device, a posture thereof, etc. The sensor module 430 can be the sensor module 240 of FIG. 2. The sensor module 430 can include a tilt sensor, an acceleration sensor, a gyro sensor, etc. The sensor module 430 can further include some or all of a pressure sensor, a proximity sensor, a barometer, a terrestrial magnetism sensor (or compass sensor), an ultrasonic sensor, an optical flow sensing movement by using an image, a temperature-humidity sensor, an illuminance sensor, a UV sensor, and/or a gesture sensor.

The sensor module 430 according to various example embodiments of the present disclosure can recognize at least one of a tilting of the electronic device, a movement thereof, and/or a grasping thereof in a photographing mode. The tilt sensor can sense the tilting of the electronic device. The tilt sensor can be replaced with the acceleration sensor and/or the gyro sensor as well.

The input module 440 may include various input circuitry, and may include, for example, the entire or partial construction of the input output interface 150 of FIG. 1 and the input device 250 of FIG. 2. The input module 440 can input an input and data for controlling an operation of the electronic device. The input module 440 can be a touch panel. The input module 440 can include a (digital) pen sensor. The input module 440 can include key buttons.

The display module 450 can be the display 160 of FIG. 1 or the display 260 of FIG. 2. The display module 450 can be a Liquid Crystal Display (LCD), or a Light Emitting Diode (LED) display. The LED display can include an Organic LED (OLED) and an Active Matrix OLED (AMOLED), or the like.

The input module 440 and the display module 450 can include a touch screen. The touch screen can display a screen under the control of the processor 400, and can detect a touch, gesture, proximity, or hovering input using an electronic pen or a part of the user's body.

The electronic device according to various example embodiments of the present disclosure can further include a communication module (not shown in FIG. 4). The communication module can include various communication circuitry, including, for example, and without limitation, at least one of a wireless communication module and a wired communication module. The wireless communication module can include some or all of an RF module, a cellular module, a WiFi module, a Bluetooth module, and/or a GPS module.

The cellular module can use at least one of Long Term Evolution (LTE), LTE-Advanced (LTE-A), Code Division Multiple Access (CDMA), Wideband CDMA (WCDMA), Universal Mobile Telecommunications System (UNITS), Wireless Broadband (WiBro), Global System for Mobile Communications (GSM), etc.

Also, the communication module can include at least one of a WiFi module, a Bluetooth (BT) module, Near Field Communication (NFC), a Global Navigation Satellite System (GNSS), a GPS, etc. In accordance with a use area, a bandwidth, etc., the GNSS can, for example, include at least one of a GPS, a Global navigation satellite system (Glonass), a Beidou navigation satellite system (hereinafter, "Beidou"), Galileo, or the European global satellite-based navigation system. The "GNSS" of the communication module can be used interchangeably with the "GPS".

Figure 5:
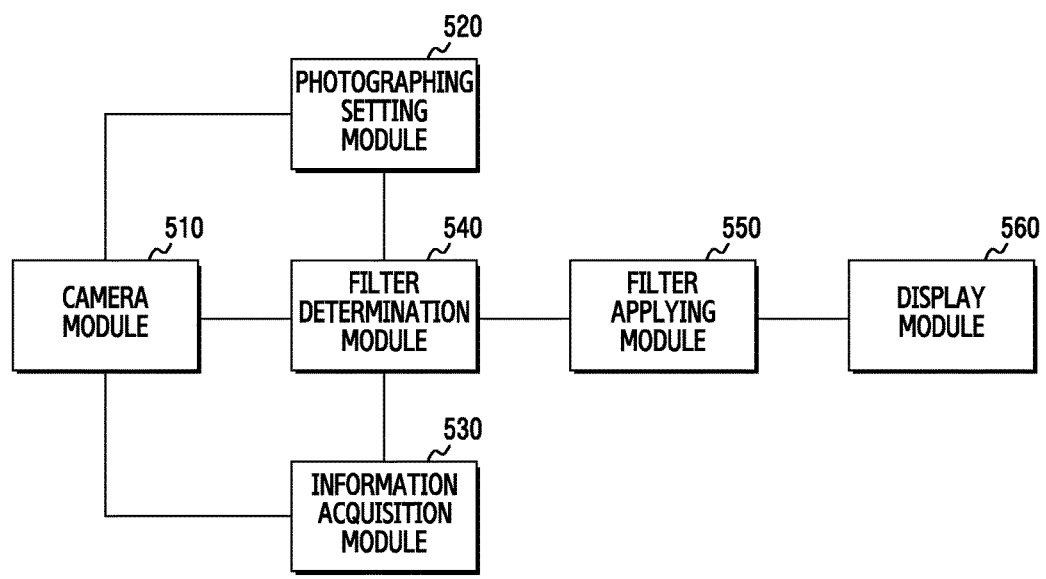
FIG. 5 is a block diagram illustrating an example apparatus for processing an acquired image and generating a new image in an electronic device according to various example embodiments of the present disclosure.

FIG. 5 is a diagram illustrating an example apparatus for processing an acquired image and generating a new image in an electronic device according to various example embodiments of the present disclosure.

Referring to FIG. 5, the electronic device can include a camera module 510, a photographing setting module 520, an information acquisition module 530, a filter determination module 540, a filter applying module 550, and/or a display module 560.

The camera module 510 can be the camera module 420 of FIG. 4. The camera module 510 may include various circuitry and elements that can convert an optical signal into an electrical signal, and output the electrical signal as image data. The camera module 510 can include an image sensor. The image sensor can acquire image data from an optical signal that is incident through a lens.

The image sensor can include a one-piece type image sensor capable of generating an image and a signal for extracting distance information, and a stereo type image sensor generating each of an image and a signal for extracting distance information.

According to an example embodiment, the one-piece type image sensor can be an image sensor (for example, 2-PD image sensor, 4-PD image sensor, etc.) in which one unit pixel has a plurality of sub pixels, an image sensor comprising a top surface phase difference sensor and pixel sensors, etc. The one-piece type image sensor can output the signal for extracting the distance information and the image data, at the same time. The image data and the signal for extracting the distance information that are output from the image sensor can be mapped to each other.

According to an example embodiment, a stereo type image sensor can independently construct each of a color sensor array generating color data and a depth sensor array outputting a signal for calculating (determining) distance information. For example, the depth sensor array can be an IR sensor array. The stereo type image sensor can independently generate each of a color image and a signal for extracting distance information. For example, the stereo type image sensor can generate the color image and the signal for extracting the distance information at mutually different time.

The image sensor of the camera module 420 according to various example embodiments of the present disclosure can be the one-piece type image sensor including all of sensors generating an image and a signal for determining distance information. The image sensor of the camera module 420 according to various example embodiments of the present disclosure can be the stereo type image sensor individually generating an image and a signal for determining distance information as well.

The image sensor according to various example embodiments of the present disclosure can generate image data that includes an image and a signal for determining distance information. The image and the signal for determining the distance information can be generated at the same time, or the image and the signal for determining the distance information can be generated individually. Also, the image and the signal for determining the distance information can be mapped by pixel or by set region, or may not be mapped.

The photographing setting module 520 can include various circuitry and/or program elements configured to set a general photographing condition such as a focus of the camera module 510, light exposure, white balance, etc. The photographing setting module 520 can set the applying or non-applying of an image processing technique to images acquired from the camera module 510. For example, the image processing technique can be image filtering. If a photographing operation applying an image filter is set, the photographing setting module 520 can set a photographing condition that is set in the camera module 510, and can set to determine the image filter in the filter determination module 540.

The information acquisition module 530 can include various circuitry and/or program elements configured to get information such as a position relationship between objects that construct the field, a position relationship between the object and the electronic device, a photographing posture of the electronic device, etc. For example, the information acquisition module 530 can sense a signal capable of extracting distance information from image data that is acquired in the camera module 510, and acquire (e.g., determine) distance information of objects.

The information acquisition module 530 can include various circuitry and/or program elements configured to be aware of a position relationship between the electronic device and the objects, based on the acquired distance information (e.g., depth map). The distance information can be acquired using an image sensor (for example, 2-PD image sensor or 4-PD image sensor) having a plurality of sub pixel detection elements (e.g., photo diodes or photo detectors (PD)) as the unit extracting one pixel image, an image sensor including a top surface phase difference sensor, a TOF image sensor, a structured-light image sensor, a focus-adjustment image sensor, an IR or ultrasonic image sensor, etc. According to an example embodiment, in case where it is the 2-PD image sensor, the information acquisition module 530 can determine a phase difference between signals of two sub pixels within a unit pixel, to acquire a signal for extracting distance information. According to an example embodiment, in case where it is the image sensor including the top surface phase difference sensors, the information acquisition module 530 can acquire distance information based on signals of the top surface phase difference sensors within the image sensor. The distance information acquired in the information acquisition module 530 can be a depth map.

According to an example embodiment, the image sensor of the camera module 510 can be a two-Dimensional (2D) image sensor generating image data. For example, the image sensor has a color pixel sensor array, and may not generate a signal for extracting distance information. In case where the image sensor is the two-dimensional image sensor, the information acquisition module 530 can extract (e.g., image matching) an edge or boundary of image data generated in the image sensor. The edge or boundary of the image data can be extracted based on a contour line of an image, a change of color data, etc.

The information acquisition module 530 can acquire photographing posture information of the electronic device. For example, when a user performs a photographing operation through the camera module 510, the information acquisition module 530 can sense a posture of the electronic device and a change of the posture from an output of the acceleration sensor and/or gyro sensor of the sensor module 430.

Based on an image output in the camera module 510 and/or distance information (e.g., depth map) output in the information acquisition module 530, the filter determination module 540 can determine configuration information of an object constructing the image. The configuration information of the object can include a position of the object in an image range (e.g., photo range), a size of the object, depth information between the object and the electronic device, etc. Based on the configuration information of the object, the filter determination module 540 can set an image processing technique suitable to the object within the image. For example, the image processing technique can be an image filter. The set image filter can be one image filter or a plurality of image filters.

The filter determination module 540 can include various circuitry and/or program elements, such as, for example, and without limitation, a recognition module and a filter determination module. The recognition module recognizes configuration information of a main object based on image data output in the camera module 510 and/or distance information (e.g., depth map) output in the information acquisition module 530. The filter determination module automatically may automatically set an image filter based on the recognized configuration information.

According to an example embodiment, the recognition module of the filter determination module 540 can recognize configuration information of an object, based on distance information (e.g., depth map) output in the information acquisition module 530. For example, the recognition module of the filter determination module 540 can recognize the configuration information of the object, based on image data output in the camera module 510 and distance information output in the information acquisition module 530.

According to an example embodiment, if the image sensor of the camera module 510 is an image sensor (for example, stereo type image sensor) generating a signal for extracting distance information and image data at mutually different time, the recognition module of the filter determination module 540 can synchronize frames of the image data and the signal extracting the distance information and perform a recognition operation.

According to an example embodiment, when the signal for extracting the distance information and the image data are not mapped by pixel in the image sensor of the camera module 510, the recognition module of the filter determination module 540 can map the image data and the signal for extracting the distance information in a set form (for example, map a region of the image data and a region generating the signal for extracting the distance information) and perform a recognition operation.

The filter applying module 550 can process image data acquired in the camera module 510 based on the image processing technique determined in the filter determination module 540. If the image processing technique is an image filtering method, the filter applying module 550 can access data corresponding to an image filter determined in the filter determination module 540, through the memory module 410. And, the filter applying module 550 can apply the set image filter to the image data acquired in the camera module 510, to generate a new image.

The display module 560 can display an image (for example, a new image applying an image filter to an image) applied by the filter applying module 550.

An image displayed in the display module 560 can be a preview image (or live image). The electronic device can display an image acquired in the camera module 510, as a preview image in the display module 560. If a capture request is generated, the electronic device can store in the memory module 410 an image acquired in the camera module 510. For example, if a photographing operation applying an image filter is requested, the photographing setting module 520 can set a photographing mode, and the filter determination module 540 can set an image filter. The camera module 510 can generate image data including a main object. The image data can include a signal capable of extracting distance information between the electronic device and objects, and image data of the object. The information acquisition module 530 can extract distance information of an object from image data output in the camera module 510, to generate the distance information (e.g., depth map) between the electronic device and the objects. The information acquisition module 530 can extract photographing posture information of the electronic device, based on an output of the sensor module 430 of FIG. 4.

The filter determination module 540 can recognize the setting of an image processing technique (for example, image filtering method) by an output of the photographing setting module 520. The filter determination module 540 can recognize a feature of an object (e.g., a constituent element of the object included in an image, a position relationship, etc.) by an output of the information acquisition module 530. Based on the recognized object feature, the information acquisition module 530 can extract range information (e.g., depth map) of the object. Based on this information, the information acquisition module 530 can determine a filter that will be applied to an image. The filter applying module 550 can apply the set image filter determined in the filter determination module 540 to the image acquired in the camera module 510, to generate a new image. The new image can be an image applying the set image filter to the acquired image.

The display module 560 can display a new image that is generated in the filter applying module 550. The new image displayed on the display module 560 may be an image applying an image filter that is determined based on a distance between the object and the electronic device. And, the new image can be displayed as a preview image. The display module 560 can display posture information of the electronic device that is acquired in the information acquisition module 560.

A user can check a new image displayed in the display module 560 and correct a posture of the electronic device. Also, based on the posture correction of the user, the information acquisition module 530 can acquire distance information of the object included in the image and posture information of the electronic device. The filter determination module 540 can determine range information (e.g., depth map) of a new image in accordance with the distance information and posture information that are corrected by an output of the information acquisition module 530.

If a desired image is displayed in the display module 560, the user can generate a capture command. If the capture command is generated, the processor 400 can store in the memory module 410 a new image displayed in the display module 510. The image stored in the memory module 410 can be an image to which a filter is applied. The image stored in the memory module 410 can include all of an image acquired in the camera module 510 and the image to which the filter is applied.

FIGS. 6A, 6B, 6C, 6D and 6E are diagrams illustrating image filters according to various example embodiments of the present disclosure.

Figure 6A:
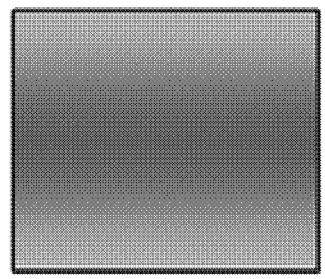
FIGS. 6A, 6B, 6C, 6D and 6E are diagrams illustrating example image filters according to various example embodiments of the present disclosure.

FIG. 6A is a diagram illustrating an example characteristic of an example linear filter. The linear filter can be a filter in which a focused point gets clear and, as it is farther away from the focused point, a blur gets heavier. The blur can have the same-level blur in the direction of one axis. A blur level can change in a direction vertical to the axis. The change of the blur level can be different according to a posture (e.g., tilting) of an electronic device (for example, camera). The linear filter can process to make clear the focused point in an image, and increase a blur intensity as it is farther away from a focus. For example, the size of a filter mask increases or the form of a mask coefficient becomes different.

The linear filter can include a linear filter for emphasizing an object, a linear filter capable of blurring the background, and/or a linear filter capable of emphasizing the object and blurring the background.

Figure 6B:
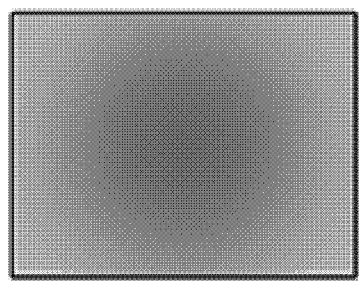

FIG. 6B is a diagram illustrating an example characteristic of an example circular filter (or radial filter or polygonal filter). To catch eyes of a viewer who views an image, the circular filter can emphasize a specific object. For example, the circular filter can increase an exposure and definition for an internal region of a corresponding figure such that attention can be paid to an object based on a shape of a circular form (for example, circle, oval or polygon) around the object. The circular filter can include a circular filter capable of blurring a focus of the background of an image, a circular filter capable of emphasizing an object, or a circular filter capable of blurring the background and emphasizing the object.

Figure 6C:
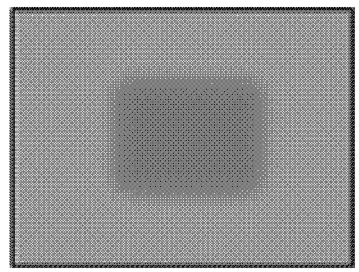

FIG. 6C is a diagram illustrating an example characteristic of an example lighting filter (or lighting effect). The lighting filter can apply several lighting effects to a Red, Green, and Blue (RGB) image. The lighting filter can produce and store a three-Dimensional (3D) effect through a texture of a grey shadow filter that is called a bump map, and use the stored 3D effect for another image as well. The lighting filter can use a light source. The lighting filter can adjust a lighting range, and can change a direction as well. The lighting filter can adjust a lighting intensity, the lighting range, a lighting exposure, etc.

Figure 6D:
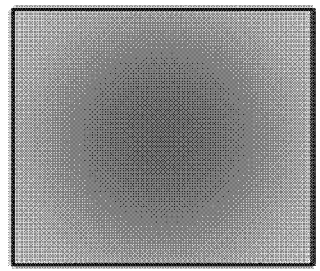

FIG. 6D is a diagram illustrating an example characteristic of an example macro filter. Macro photographing can be photographing that fills the entire image frame with an object by close-up photographing the object. For example, the macro photographing increases an amount of out-focus as it gets closer to the object, and can acquire an image that out-focus processes all of the foreground and the background. The macro photographing can be free to change a photographing angle and composition and thus, can be suitable to photographing a small thing. For example, the macro photographing can be a method of photographing at a distance very close to an object. The attraction of the macro photographing is to be aware of the micro world that cannot be seen with naked eyes, by close-up photographing the object.

In various example embodiments of the present disclosure, if a distance with an object is sensed to be large, the electronic device can perform a zooming operation to macro photograph the object. The electronic device can apply the macro filter to a macro photographed image, to emphasize the object. For example, if the circular filter is determined as a result of analyzing distance information between the electronic device and the object and it is recognized that a distance with the object is distant, the electronic device can perform the zooming operation to acquire an object image, and set the circular filter and the macro filter to process the image. The macro filter can include a macro filter for emphasizing an object, a macro filter capable of blurring the background, or a macro filter capable of emphasizing the object and blurring the background.

Figure 6E:
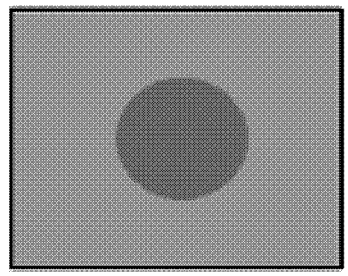

FIG. 6E is a diagram illustrating an example characteristic of an example selective focus (or narrow Depth Of Field (DOF)) filter. When processing an image, if the selective focus filter produces to blur the foreground and/or background of an object, the selective focus filter can have an effect in which the object is more emphasized.

The electronic device according to various example embodiments of the present disclosure can acquire distance information (e.g., depth map) based on an acquired image, and recognize a range of an object based on the distance information, and automatically determine an image processing technique (for example, image filtering method) based on the recognized range of the object. The image processing technique may, for example, determine at least one image filter among image filters of FIG. 6A to FIG. 6E and apply the determined image filter to the acquired image, thereby generating a new image. The camera module can generate distance information of objects that construct an image. An image sensor of the camera module can be a multi PD image sensor in which a unit pixel has a multi sub pixel construction, an image sensor including a top surface phase difference sensor, a TOF image sensor determining a distance (e.g., depth) by measuring the time taken for an output optical signal to reflect and return, a structured-light image sensor, a focus-adjustment image sensor, an IR image sensor, and/or an ultrasonic image sensor.

Figure 7:
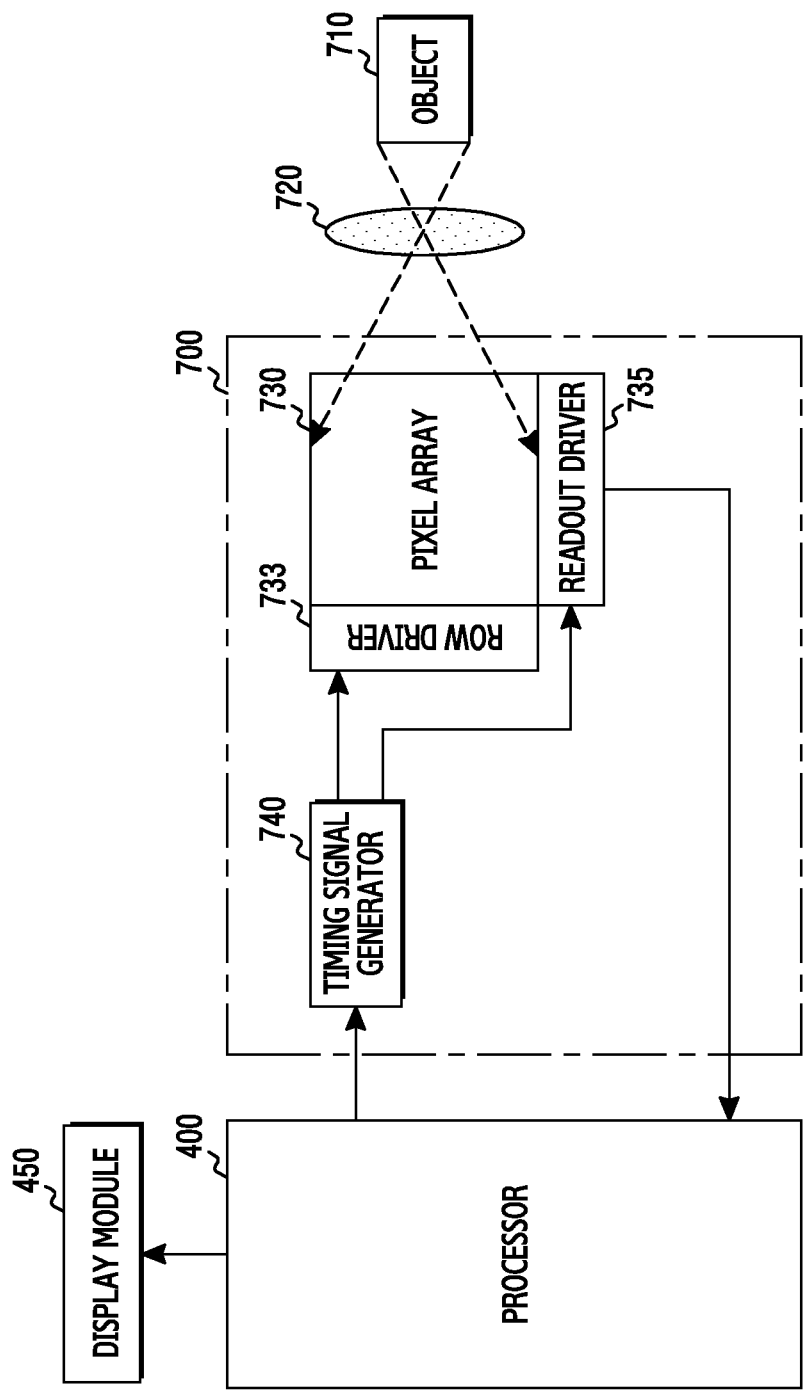
FIG. 7 is a diagram illustrating an example image sensor according to various example embodiments of the present disclosure.

FIG. 7 is a diagram illustrating an example image sensor according to various example embodiments of the present disclosure.

Referring to FIG. 7, the electronic device can include the processor 400, the image sensor 700, and the display module 450. The image sensor 700 can include a pixel array 730, a row driver 733, a readout driver 735, and/or a timing signal generator 740.

According to various example embodiments, the image sensor 700 can generate an incident optical signal as image data. The processor 400 can process the generated image data and display the processed image data on the display 160 that is operatively coupled with the electronic device. The processor 400 can check a mode for processing the image data acquired in the image sensor 700, and process the image data based on the checked mode.

The pixel array 730 can sense an object 710 that is captured through a lens 720. The pixel array 730 can convert an optical signal of the lens 720 into an electrical signal and generate image data. The timing signal generator 740 can generate a timing signal for activating row line pixels of the pixel array 730 through the row driver 733. And, the timing signal generator 740 can generate a timing signal for reading-out column line pixels of the pixel array 730. The pixel array 730 can activate the row line pixels by the row driver 733, and can read-out the column line pixel signals by the readout driver 735. In FIG. 7, it is illustrated that the timing signal generator 740 is included in the image sensor 700, but can be included in the processor 400.

The pixel array 730 can be an array of pixels that include a micro lens, a color filter, and photo diodes. The pixel array 730 can include a plurality of unit pixels, and each unit pixel can include a plurality of sub pixels. The sub pixel can include the photo diode. The image sensor 700 can, for example, include a structure in which one unit pixel has at least two or more sub pixels (e.g., photo diodes (PD)). The image sensor 700 can output color information including at least one piece of color information among Red (R), Green (G), and Blue (B).

Figure 8:
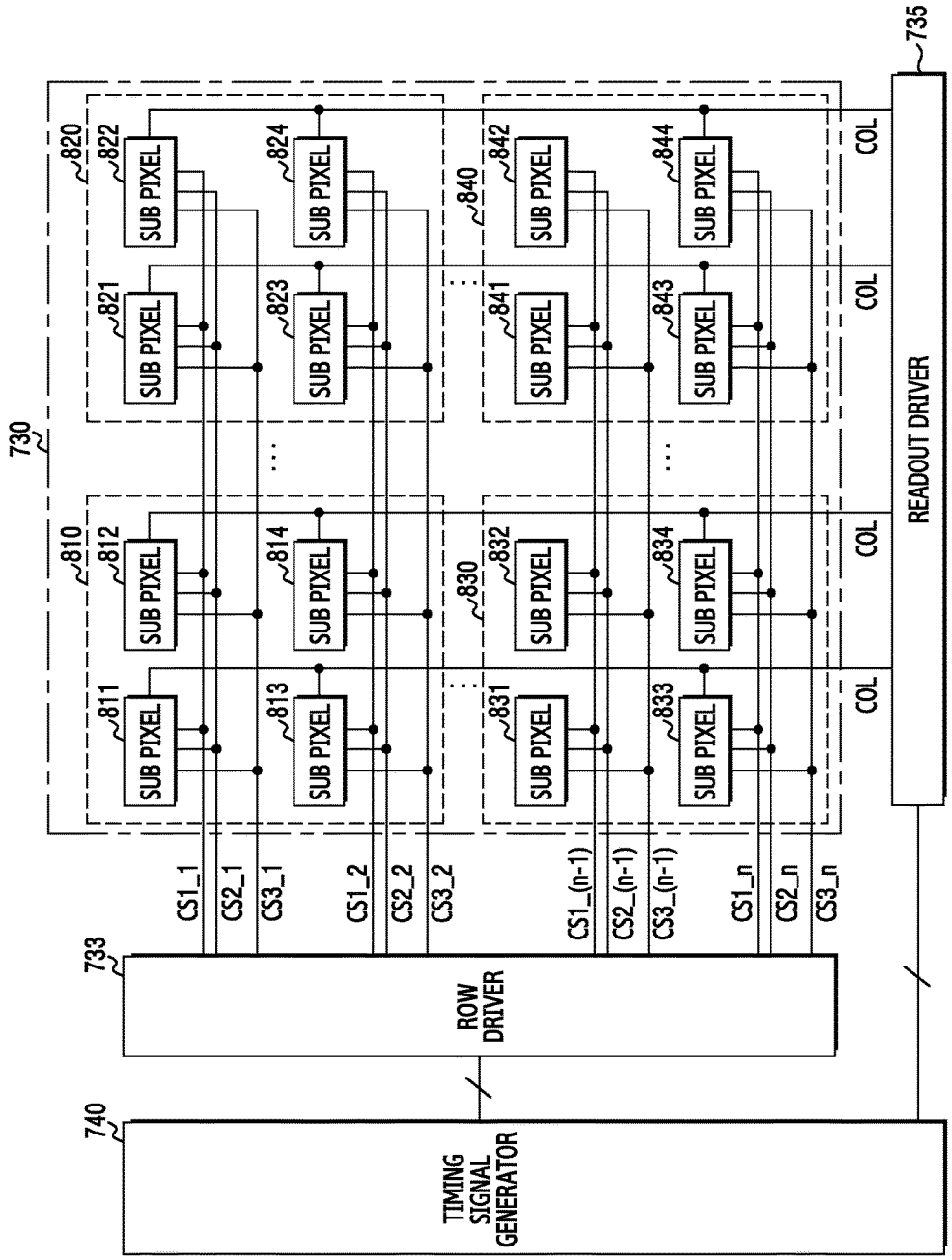
FIG. 8 is a diagram illustrating an example pixel array of an image sensor according to an example embodiment of the present disclosure.

FIG. 8 is a diagram illustrating an example pixel array of an image sensor according to an example embodiment of the present disclosure.

Referring to FIG. 8, the pixel array 730 can include a plurality of unit pixels 810 to 840 that are arrayed in a matrix form. Each of the unit pixels 810 to 840 can include a plurality of sub pixels. The pixel array 730 can at one time output signals of as many sub pixel levels as a multiplication of the number of the entire unit pixels and the number of sub pixels of each unit pixel. The pixel array 730 can also sum up signals of sub pixel levels of one unit pixel and output as many signals as the number of the entire unit pixels The unit pixel can include at least two sub pixels. FIG. 8 illustrates an example in which one unit pixel includes four sub pixels. In FIG. 8, a 1st unit pixel 810 can include four sub pixels 811 to 814, and a 2nd unit pixel 820 can include four sub pixels 821 to 824, and a 3rd unit pixel 830 can include four sub pixels 831 to 834, and a 4th unit pixel 840 can include four sub pixels 841 to 844 as well.

A sub-pixel pitch of the pixel array 730 according to various example embodiments of the present disclosure can be smaller than a pixel pitch of a common pixel array. FIG. 8 illustrates that the unit pixels 810 to 840 include four sub pixels, respectively, but is not limited to this. The unit pixels can include two sub pixels, respectively. For example, the 1st unit pixel 810 can include two sub pixels 811 and 812, and the 2nd unit pixel 820 can include two sub pixels 821 and 822, and the 3rd unit pixel 831 can include two sub pixels 831 and 832, and the 4th unit pixel 840 can include two sub pixels 841 to 842.

According to an example embodiment, the timing signal generator 740 can generate a timing signal for driving a row line and a column line of the pixel array 730 by the row driver 733 and the readout driver 735. The pixel array 730 can activate pixels by the unit of row line based on a row line control of the row driver 733. The readout driver 735 can output a signal of each sub pixel level along the column line in accordance with the control of the timing signal generator 740.

The unit pixels 810 to 840 of the pixel array 730 can each include a micro lens and/or each color filter installed at an upper part. The micro lens can increase each light gathering power. Each color filter can transmit or block light of a specific spectrum range. The sub pixels within the unit pixel can include a photo diode. For example, the sub pixels can share one micro lens and color filter, and can use respective photo diodes. For example, in case where one unit pixel includes four sub pixels, the four sub pixels can convert an optical signal received through one micro lens and color filters, into an electrical signal through respective corresponding photo diodes.

The row driver 733 can drive control signals for controlling respective operations of a majority of sub pixels, into the pixel array 730 under the control of the timing signal generator 740. For example, the control signals can include a signal for selecting the sub pixels and a signal for resetting. The readout driver 735 can include elements (for example, Analog to Digital Converter (ADC), etc.) for selecting the column lines of the pixel array 730 and reading-out signals of sub pixel levels of the selected column lines.

According to an example embodiment, the readout driver 735 can output signals of respective sub pixel levels of the unit pixels 810 to 840. For example, the readout drivers 810 to 840 can read-out image signals sensed in the respective sub pixels. The processor 400 can treat and/or process the sub pixel signals and generate angular information and/or distance information (e.g., depth data).

Figure 9A:
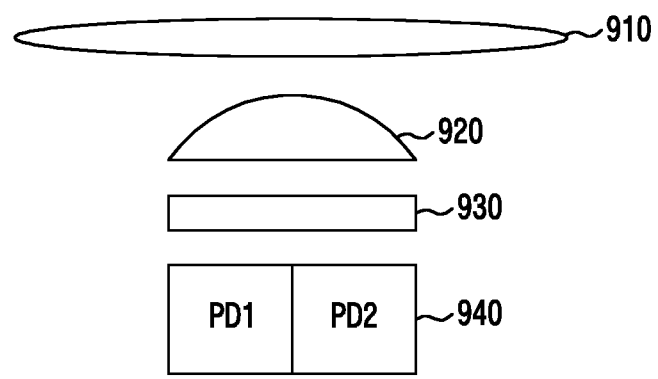
FIGS. 9A, 9B and 9C are diagrams illustrating example structures of a unit pixel and sub pixels of an example image sensor according to various example embodiments of the present disclosure.
Figure 9B:
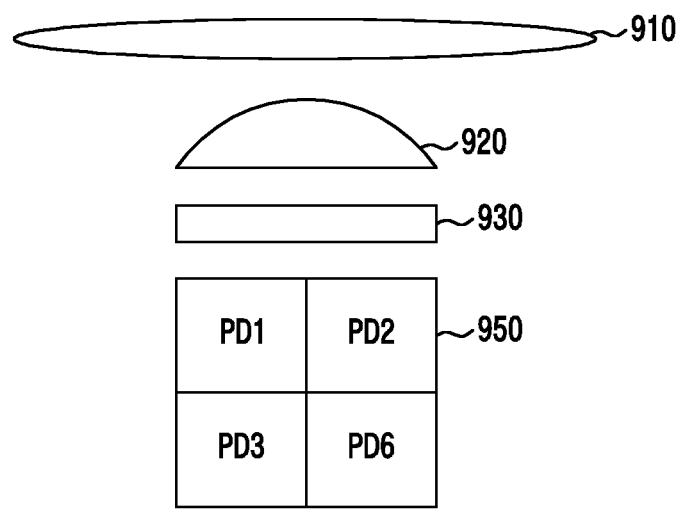
Figure 9C:
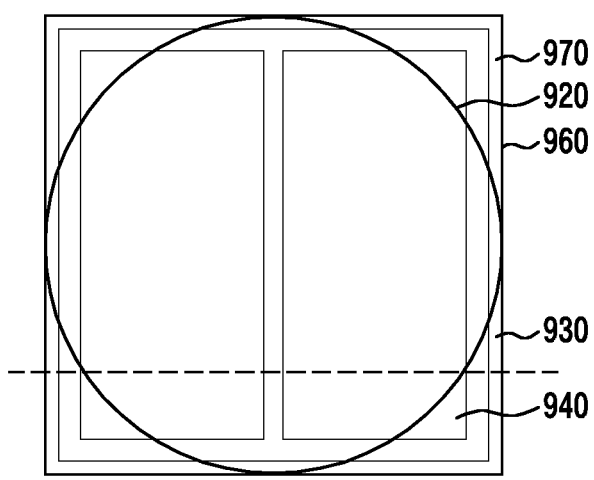

FIGS. 9A, 9B and 9C are diagrams illustrating example structures of an example unit pixel and sub pixels of an example image sensor according to various example embodiments of the present disclosure.

FIG. 9A is a diagram illustrating an example in which the unit pixel of the image sensor includes two sub pixels. FIG. 9B is a diagram illustrating an example in which the unit pixel of the image sensor includes four sub pixels. FIG. 9C is a diagram illustrating an example of a structure of the unit pixel having the two sub pixels as in FIG. 9A.

Referring to FIG. 9A, the unit pixel of the image sensor 700 can include at least one micro lens 920, at least one color filter 930, and/or a light receiving part 940 including two photo diodes (PD1 and PD2). For example, the unit pixel of FIG. 9A can generate two sub pixel signals. The following description will be made in which the image sensor having the unit pixel structure of FIG. 9A is used interchangeably with a 2-PD image sensor. Referring to FIG. 9B, the unit pixel of the image sensor 700 can include one micro lens 920, one color filter 930, and/or a light receiving part 950 including four photo diodes (PD1 to PD4). For example, the unit pixel of FIG. 9B can generate four sub pixel signals. The following description will be made in which the image sensor having the unit pixel structure of FIG. 9B is used interchangeably with a 4-PD image sensor.

In FIG. 9A or FIG. 9B, the light receiving part 940 or 950 can convert incident light received through the lens 910 into an electrical signal, and generate the converted electrical signal. The light receiving part 940 or 950 can include doping regions of a laminated form. The doping regions can be laminated based on an incident angle of the incident light.

Referring to FIG. 9C, the image sensor 700 can include a plurality of unit pixels. Each unit pixel 960 can include at least two or more photo diodes. And, a barrier 970 can be located between the respective photo diodes. For example, at least one color filter 930 can be located on the plurality of photo diodes. Also, for example, at least one micro lens 920 can be located on the plurality of photo diodes. The micro lens 920 can be, for example, located on the color filter 930. For example, light incident on each unit pixel 960 can be incident on the respective different photo diodes via at least one micro lens 920 and at least one color filter 930. The image sensor 700 can output information for focus detection in accordance with a phase difference of light that is incident on the respective photo diodes.

According to an example embodiment, a lens 910 can be operatively coupled with an actuator for Optical Image Stabilization (OIS) or Auto Focus (AF).

According to an example embodiment, the color filter 930 can be a Red (R) filter, a Green (G) filter, or a Blue (B) filter, or can be a yellow filter, a magenta filter, or a cyan filter, or the like, but is not limited thereto.

According to an example embodiment, the color filter 930 can be formed on the photo diode 940 or 950 based on an incident angle of incident light, and can have a Bayer pattern. The Bayer pattern can arrange filters for accepting the brightness of each of red, green, and/or blue on a two-dimensional plane in order to gather the brightness and color of a target and make image data made with points. Each unit pixel forming a lattice network under a Bayer pattern color filter recognizes not the total natural color but only assigned color among red, green, and/or blue and, by interpolating this, analogizes the natural color.

According to an example embodiment, the micro lens 920 can be formed to correspond to the photo diode 940 or 950 on the color filter 930 as maintaining a tiling angle at which the color filter 930 is laminated. The OIS lens 910 can be, for example, located inside a lens mount (not shown), and can gather light.

According to an example embodiment, the processor 400 can process (for example, add and average) signals of respective sub pixels of a unit pixel, and output the processed signals as image data. According to an example embodiment, the processor 400 can determine a phase difference between the signals of the sub pixels included in the unit pixel, to generate distance information (e.g., depth information). For example, in FIG. 9A, the processor 400 can determine a phase difference between two sub pixel signals of the unit pixel, to generate depth information. The processor 400 can process the two sub pixel signals to generate color image data. For example, if the image sensor 700 having the pixel array 730 of a High Definition (HD) (1,280×720) size has a 4-PD structure in which one unit pixel has four sub pixels, the image sensor 700 can read a color value of each photo diode and output image data having a resolution of Quad HD (QHD) (2,560×1,440).

Figure 10A:
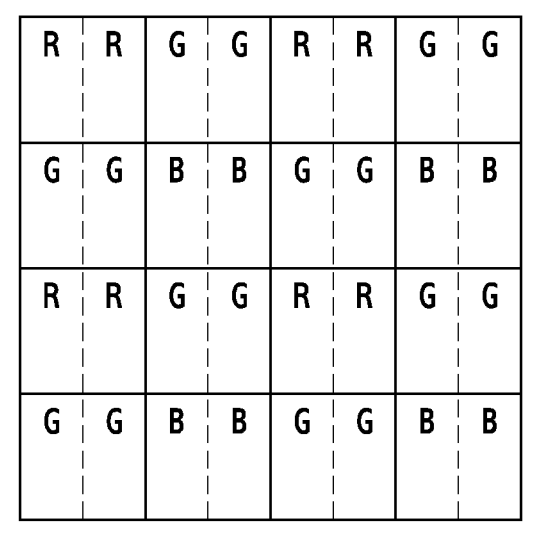

FIG. 10A and FIG. 10B are diagrams illustrating examples of a unit pixel and sub pixels of an image sensor according to various example embodiments of the present disclosure. FIG. 10A is an example diagram in which the unit pixel of the image sensor includes two sub pixels. FIG. 10B is an example diagram in which the unit pixel of the image sensor includes four sub pixels.

The image sensor 700 can include a plurality of unit pixels. Each unit pixel can include a plurality of sub pixels. The R pixel can be a pixel image for red color, and the G pixel can be a pixel image for green color, and the B pixel can be a pixel image for blue color.

According to an example embodiment, one unit pixel can include at least two or more sub pixels (e.g., photo diodes). Each unit pixel can include one micro lens and color filter. The unit pixel can output a signal of one sub pixel level and thus one unit pixel can include a plurality of data.

According to an example embodiment, the unit pixel can sum up signals of at least two or more sub pixel levels included and output the signals as one image data as well. The unit pixel can output phase difference information for determining a phase difference of light that are incident on at least two sub pixels as well. For example, in case where the unit pixel includes the two sub pixels as in FIG. 10A, the phase difference information can include information for determining a phase difference between left/right pixels. For example, in case where the unit pixel includes four sub pixels as in FIG. 10B, the phase difference information can include information for determining a phase difference between the up and down sub pixels or information for determining a phase difference between the left and right sub pixels. For example, the phase difference information can include information for determining a phase difference between diagonal sub pixels that are located diagonally. For example, the unit pixel can output information for determining a phase difference between sub pixels of a specific color as well. For example, the unit pixel can output information for determining color information and a phase difference only from the G pixel that relatively much accepts light among the RGB pixels, and output only color information from the remnant R pixel and B pixel as well.

FIG. 10A and FIG. 10B illustrate the Bayer pattern based on red, green, and blue, but an example embodiment of the present disclosure is not limited to this and can use various filter patterns.

According to various example embodiments, the processor 400 can acquire distance information and/or image data, based on sub pixel signals output from the image sensor 700. For example, the processor 400 can operate based on a photographing mode and condition and acquire the distance information (e.g., depth information) and/or the image data.

In an example embodiment, the processor 400 can determine a phase difference based on respective sub pixel signals of the image sensor 700. The processor 400 can extract distance information by using phase difference information.

In an example embodiment, the processor 400 can generate image data based on respective sub pixel signals of the image sensor 700. For example, in case where the image sensor 700 is an image sensor having a 2-PD structure, the processor 400 can process (for example, add or average) a 1st sub pixel signal and a 2nd sub pixel signal of each unit pixel, to generate image data of the unit pixel.

In an example embodiment, the processor 400 can generate phase difference information and image data based on respective sub pixel signals of the image sensor 700. For example, in case where the image sensor 700 is an image sensor having a 2-PD structure, the processor 400 can determine a phase difference between a 1st sub pixel signal and a 2nd sub pixel signal of each unit pixel, to generate distance information. The processor 400 can process the 1st sub pixel signal and the 2nd sub pixel signal, to generate image data.

In an example embodiment, the processor 400 can generate phase difference information based on respective sub pixel signals of the image sensor 700. In a case where the image sensor 700 is an image sensor having a 2-PD structure, the processor 400 can selectively process a 1st sub pixel signal and/or a 2nd sub pixel signals. For example, the processor 400 can differently adjust an operation of processing image data based on an attribute (e.g., color) of a unit pixel. For example, in case where the attribute of the unit pixel is red or blue, the processor 400 can control the image sensor 700 to output image data summing up signals (e.g., 1st signal and 2nd signal) of respective sub pixel levels. Also, in case where the attribute of the unit pixel is green, the processor 400 can control the image sensor 700 to process data (e.g., 1st signal and 2nd signal) of respective sub pixel levels into image data of a unit pixel level and output the image data.

Figure 11A:
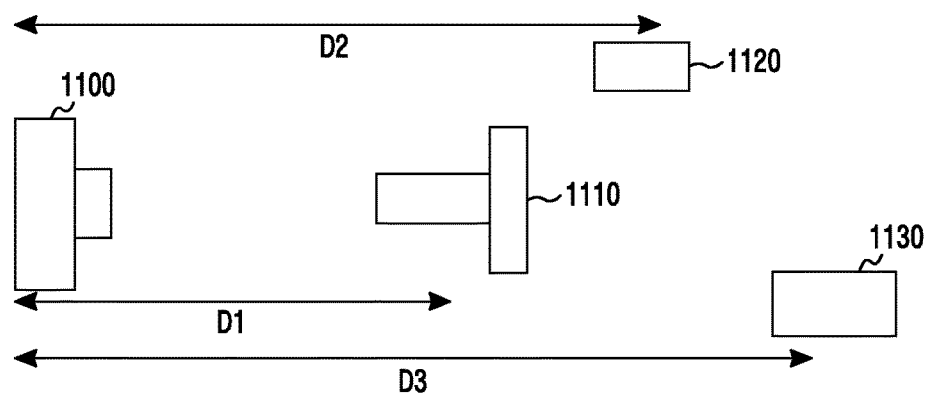
FIG. 11A and FIG. 11B are diagrams illustrating an example operation of an image sensor including a top surface phase difference sensor.
Figure 11B:
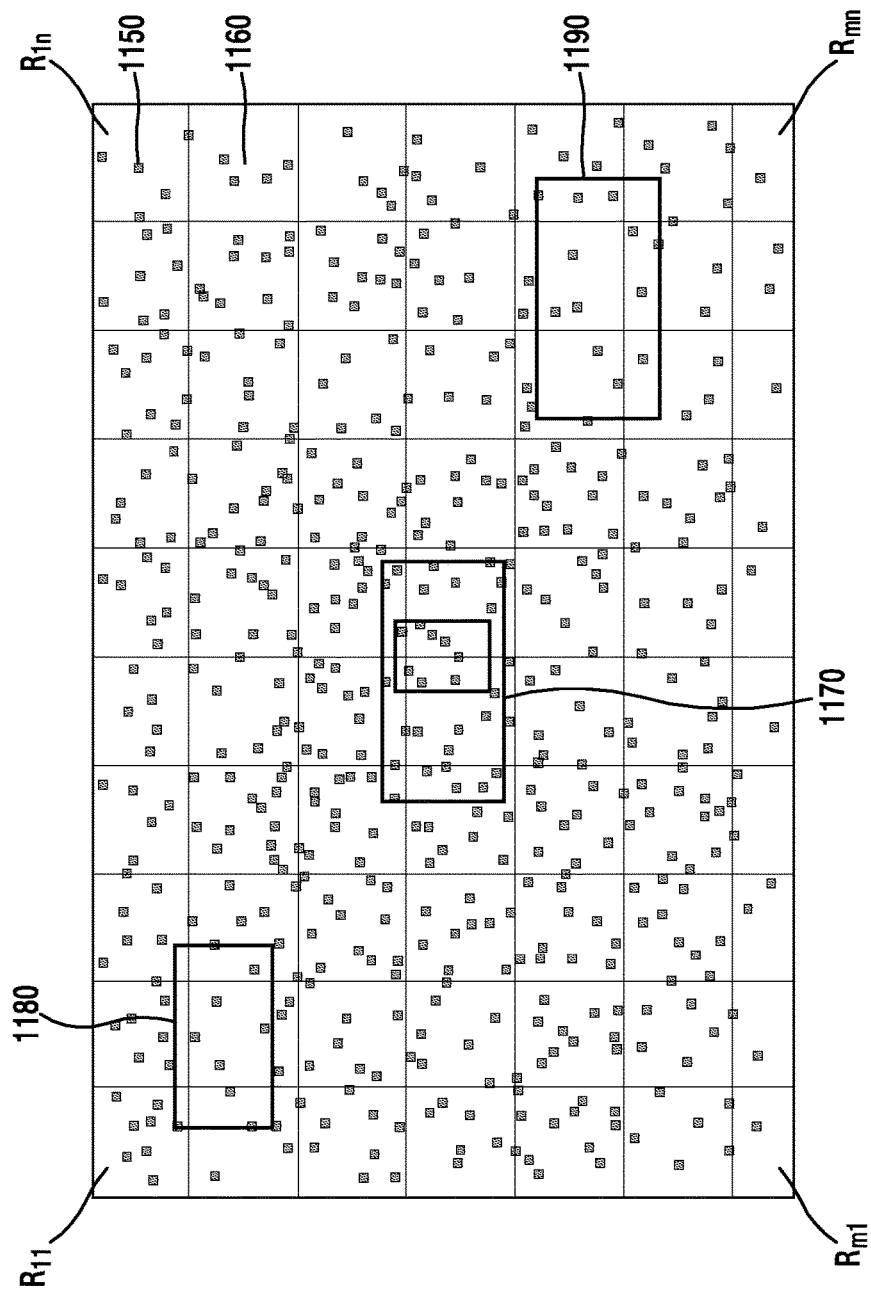

FIG. 11A and FIG. 11B are diagrams illustrating an example operation of an image sensor including a top surface phase difference sensor. FIG. 11A is a diagram illustrating positions of objects according to various example embodiments of the present disclosure.

In a state where objects 1110 to 1130 are arranged in front of the imaging device 1100 as in FIG. 11A, a user can focus the imaging device 1100 on a desired object and photograph the desired object. The imaging device 1100 can include the image sensor 700 having the construction of FIG. 7. FIG. 11A illustrates an example in which the object 1110 is located closest to a position of the imaging device 1100 at a distance (D1), the object 1130 is located farthest from the imaging device 1100 at a distance (D3), and the object 1120 is located at an intermediate distance from the imaging device 1100 at a distance (D2). In a state in which the objects are arranged in front of the imaging device 1100 as in FIG. 11A, if the user focuses the imaging device 1100 on a specific object and photographs the specific object, a photographed image can be acquired as an image in which the focused object becomes clear and other objects become less clear based on a distance spaced apart from the focused object.

Phase difference detection pixels of the imaging device 1100 can output respectively different phase difference values for the objects 1110 to 1130. For example, in case where the imaging device 1100 is focused on the object 1120, the object 1120 can be an object of a 1st focus region, and the object 1110 can be an object of a 2nd focus region, and the object 1130 can be an object of a 3rd focus region.

FIG. 11B is a diagram illustrating an example image sensor according to various example embodiments of the present disclosure.

Referring to FIG. 11B, the imaging device can include at least one phase difference detection pixel 1150 (e.g., top surface phase difference sensor) and at least one image pixel 1160 (e.g., color pixel). In FIG. 11B, a 1st image 1170 can be an image photographing a 1st object (e.g., object 1110 of FIG. 11A). A 2nd image 1180 can be an image photographing a 2nd object (for example, object 1120 of FIG. 11A). A 3rd image 1190 can be an image photographing a 3rd object (for example, object 1130 of FIG. 11A). According to an example embodiment, the electronic device (for example, processor 400 of FIG. 4) can acquire relative distance information (e.g., depth information) between the objects 1110 to 1130 sensed by the image sensor, based on a phase difference value sensed in the at least one phase difference detection pixel 1150. For example, the electronic device can acquire a distance to the 1st object 1110, based on a value of at least one phase difference detection pixel included in the 1st image 1170. For example, in case where the value of the phase difference detection pixel corresponding to the 1st image 1170 is a value corresponding to the 1st focus region, the electronic device can determine that the imaging device is focused on the 1st image 1170, and can acquire a distance (for example, D1 of FIG. 11A) to the 1st object 1110 corresponding to the 1st image 1170 based on a lens rangefinder. The electronic device can divide the image sensor into sub regions (or plurality of regions) $R_{11}$ to $R_{mn}$ (e.g., row lines $R_1$ to $R_m$ and column lines $R_1$ to $R_n$), and acquire a distance between objects corresponding to the respective sub regions based on values of phase difference detection pixels included in the respective sub regions. For example, in case where the value of the phase difference detection pixel corresponding to the 1st image 1170 is the value corresponding to the 1st focus region, and a value of a phase difference detection pixel corresponding to the 2nd image 1180 is a value corresponding to the 2nd focus region, the electronic device can acquire a relative distance between the 1st image 1170 and the 2nd image 1180.

Figure 12A:
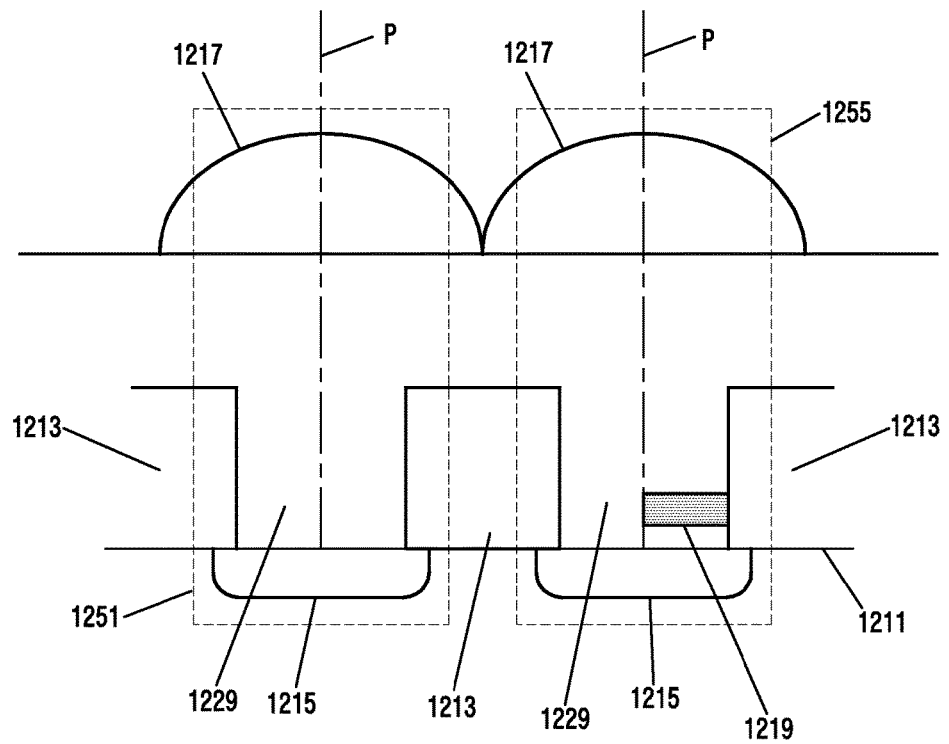
FIG. 12A and FIG. 12B are diagrams extending and illustrating a section of one portion of an example image sensor according to an example embodiment of the present disclosure.
Figure 12B:
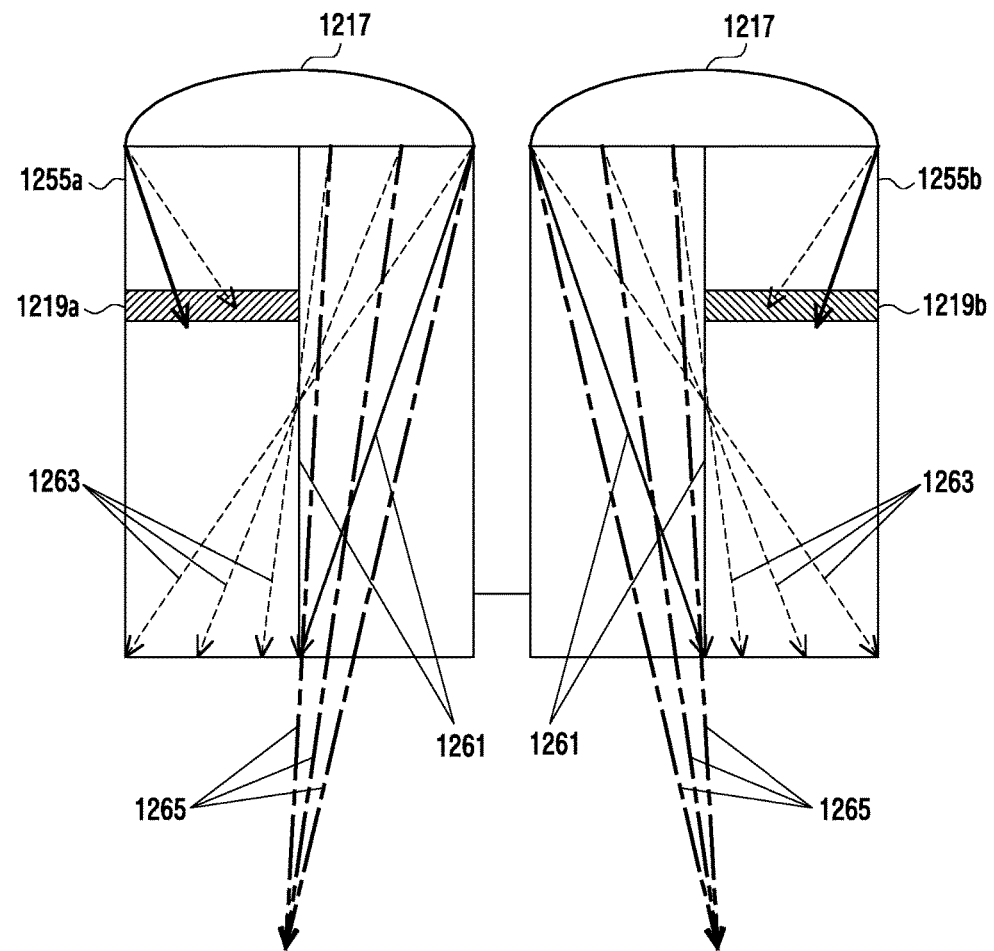

FIG. 12A and FIG. 12B are diagrams extending and illustrating a section of one portion of an example image sensor according to various example embodiments of the present disclosure.

Referring to FIG. 12A, pixels 1251 and 1255 of the image sensor (for example, pixel array 730 of FIG. 7) can include wiring regions 1213, light receiving regions 1215, and imaging lenses, for example, micro lenses 1217.

The wiring regions 1213 can be arranged to be spaced a constant distance apart on one surface of a substrate 1211 of the image sensor. The light receiving regions 1215 can be arranged between the wiring regions 1213, respectively. For instance, the wiring regions 1213 and the light receiving regions 1215 can be arranged mutually alternately on one surface of the substrate 1211. Elements such as a power source or signal line and a transistor can be arranged in the wiring regions 1213. The light receiving regions 1215 are photoelectric transformation regions substantially detecting and converting light and/or an image into an electrical signal. The light receiving regions 1215 can forward the electrical signal based on information of the detected image, to the wiring region 1213.

The respective unit pixels 1251 and 1255 can include one light receiving region 1215, a wiring and transistor of the wiring region 1213 coupled to the light receiving region 1215, and/or the micro lens 1217 arranged correspondingly to the corresponding light receiving region 1215. Among the unit pixels 1251 and 1255, a partial pixel (e.g., 1251) can operate as an image detection pixel (e.g., color pixel). Among the unit pixels 1251 and 1255, a partial pixel (e.g., 1255) can be, for example, constructed as a phase difference detection pixel having a phase separation structure.

The phase difference detection pixel 1255 can include a phase separation structure installing a light blocking film 1219 on the light receiving region 1215. Each micro lens 1217 can be arranged in a state where an optical axis (P) is coincident with the light receiving region 1215 corresponding to the micro lens 1217. A cavity 1229 is provided between the wiring regions 1213 upward the light receiving region 1215. The light blocking film 1219 can be arranged in the cavity 1229 between the wiring regions 1213. The light blocking film 1219 can cover a part (for example, about half) of a surface area of the light receiving region 1215 at one side of the light receiving region 1215, and partially block light introduced into the light receiving region 1215.

Referring to FIG. 12B, the phase difference detection pixel 1255 can be paired as denoted by reference numerals 1255a and 1255b of FIG. 12B and be arranged to be mutually adjacent or be partially spaced apart. A light blocking film 1219a can be arranged in a 1st phase difference detection pixel 1255a among the paired phase difference detection pixels 1255. The light blocking film 1219a can be arranged in a position that is not overlapped, for example, is offset with respect to a light blocking film 1219b arranged in a 2nd phase difference detection pixel 1255b. If the 1st phase difference detection pixel 1255a detects light that passes the one side of the micro lens 1217, the 2nd phase difference detection pixel 1255b can detect light that passes the other side of the micro lens 1217. An image sensor and/or an electronic device such as a camera or portable terminal equipped with the image sensor can compare values detected by the respective phase difference detection pixels 1255 and measure a focus adjustment state of the image sensor.

According to an example embodiment, the phase difference detection pixel 1255 can output a different value based on a 1st focus state (e.g., solid line 1261) in which a focus of an object is positioned at the image sensor, a 2nd focus state (e.g., dotted line 1263) in which the focus of the object is positioned between the image sensor and the object, and a 3rd focus state (e.g., chain double-dashed line 1265) in which the focus of the object is positioned in a region other than the image sensor and between the image sensor and the object. The electronic device can identify a relative distance between objects, based on the 1st focus state to the 3rd focus state.

In FIG. 12A and FIG. 12B, a description according to an example embodiment has been made for, for example, the phase difference detection pixel having the light blocking film, in order to explain the structure and operation of the phase difference detection pixel. But it will be understood that the phase difference detection pixel according to various example embodiments can include phase difference detection pixels having phase difference separation structures of various forms (or structures).

As above, when a user photographs an image with the imaging device 1100, a focus can be made in a set object position. The phase difference detection pixel (e.g., top surface phase difference sensor) 1150 arranged in the image sensor can extract distance information of a focused object and non-focused other objects. The electronic device can get a phase difference value by each pair of the phase difference detection pixels (or top surface phase difference sensors) 1150. The electronic device can also divide a region of the image sensor into sub regions as illustrated in FIG. 11B, and get phase difference values, using phase difference detection pixels (or top surface phase difference sensors) corresponding to the respective sub region.

As illustrated in FIG. 11B, the following description will be made by way of an example in which distance information of an object is determined using phase difference detection pixels corresponding to respective sub regions. An image can include two or more objects. When the electronic device determines distance information of these objects, the electronic device can get a distance between a focused object and non-focused objects (e.g., objects focused in front or focused in rear).

According to an example embodiment, the electronic device can apply an image processing technique adapted (or suitable) to a photographing object, to an acquired image, to generate a new image adapted to a user's preference (or desired by a user). The image processing technique applied to the acquired image can be automatically determined and chosen by the electronic device, or the electronic device can display analyzed image processing techniques such that the user can choose.

According to an example embodiment, the electronic device can analyze object information that is included in an image acquired in the image sensor, and determine the image processing technique, and can apply the determined image processing technique to the acquired image and display the image. For example, the image processing technique can be a method of determining an image filter applicable to the acquired image. For example, the acquired image can be a food image.

According to an example embodiment, the electronic device can acquire image data associated with food, and extract distance information between food and the electronic device based on the food image data, and generate configuration information (e.g., size of a food image, position thereof, distance information of food, etc.) of food based on the extracted distance information, and determine an image filter based on the configuration information of the food. As illustrated in FIG. 6A to FIG. 6E, the image filter can be a selection of one or more of the linear filter, the circular filter, the lighting filter, the macro filter, and/or the selective focus filter.

Figure 13A:
FIG. 13A and FIG. 13B are diagrams illustrating an example of displaying acquired image and distance information in an electronic device according to various example embodiments of the present disclosure.
Figure 13B:
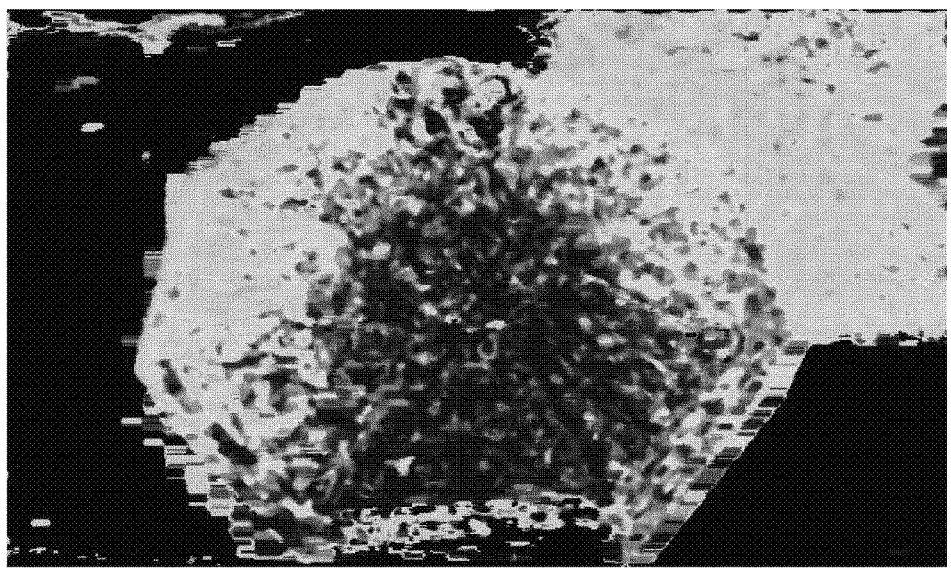

FIG. 13A and FIG. 13B are diagrams illustrating an example of displaying an acquired image and distance information that is extracted based on acquired image data in an electronic device according to various example embodiments of the present disclosure.

According to an example embodiment, the electronic device can include a food mode. If a user triggers a food photographing command, the electronic device (for example, photographing setting module 520) can apply an image processing technique to image data output from the camera module 510, to generate a new image.

The electronic device can acquire an image of FIG. 13A. The image of FIG. 13A is a food image, and can have a structure in which food is contained in a container. For example, objects included in the image can be a container, food, etc. The image sensor of the camera module 510 can read out the image of FIG. 13A. The processor 400 can extract information such as a position relationship between the objects (for example, container and/or food) included in the image output from the camera module 510, a position relationship between the object and a photographing unit (e.g., camera), a posture of the photographing unit, etc. For example, if a unit pixel is an image sensor (for example, 2-PD image sensor, 4-PD image sensor, etc.) including a plurality of sub pixels as in FIG. 8, the processor 400 can acquire (estimate) distance information based on a phase difference between sub pixel signals.

The processor 400 can estimate configuration information (e.g., depth map) that can figure out the position relationship between the electronic device and the objects from the estimated distance information. A method of estimating the distance information can use a top surface phase difference image sensor, a focus-adjustment image sensor, an IR or ultrasonic image sensor, etc. besides a multi PD image sensor. The distance information (e.g., depth map) of the image can be expressed in the form of FIG. 13B as well.

FIGS. 14A, 14B, 14C and 14D are diagrams illustrating an example of image processing of an electronic device according to various example embodiments of the present disclosure.

The processor 400 can sense a posture of the electronic device and a change of the posture, based on an output of the sensor module 430. The processor 400 can determine a feature (e.g., constituent element, position relationship, etc.) of an object, based on image data output from an image sensor and estimated configuration information. The processor 400 can determine an image filter based on the determined feature of the object. For example, if the feature of the object has a form in which it is long in a horizontal, vertical or diagonal direction, the electronic device can determine a linear filter. For example, if a feature of an object 1450 has a circular or oval (for example, food contained in a spherical container) form as illustrated in FIG. 14C, the electronic device can determine a circular filter. After determining the image filter, the electronic device can apply the determined image filter to an image acquired from the image sensor, to generate a new image.

Figure 14A:
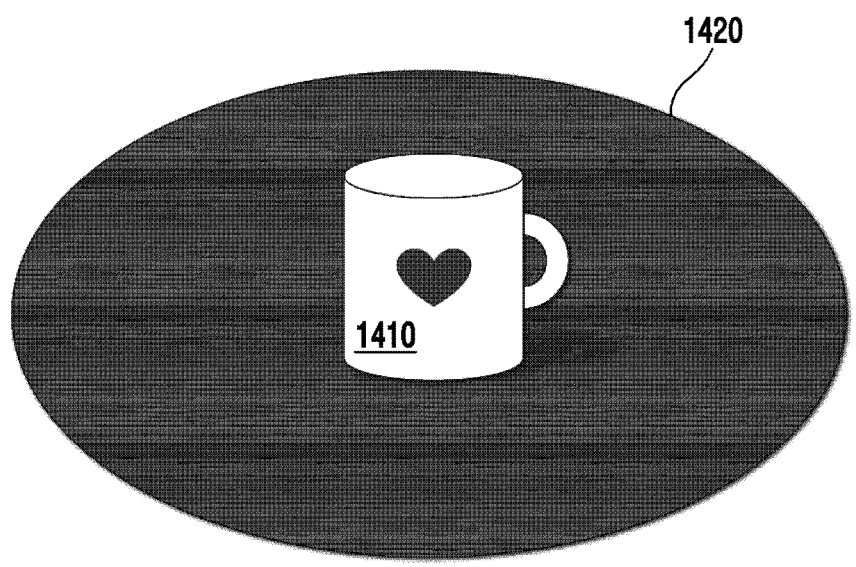
FIGS. 14A, 14B, 14C and 14D are diagrams illustrating an example of image processing of an electronic device according to various example embodiments of the present disclosure.
Figure 14B:
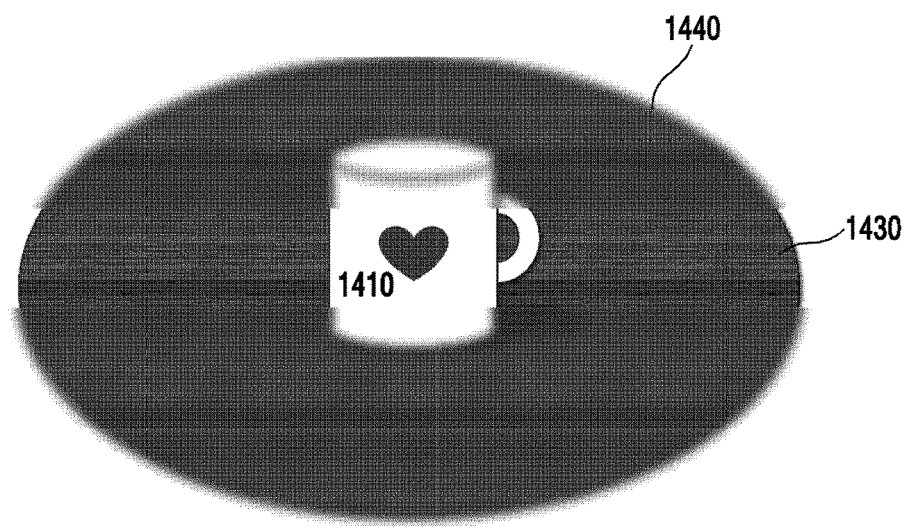
Figure 14C:
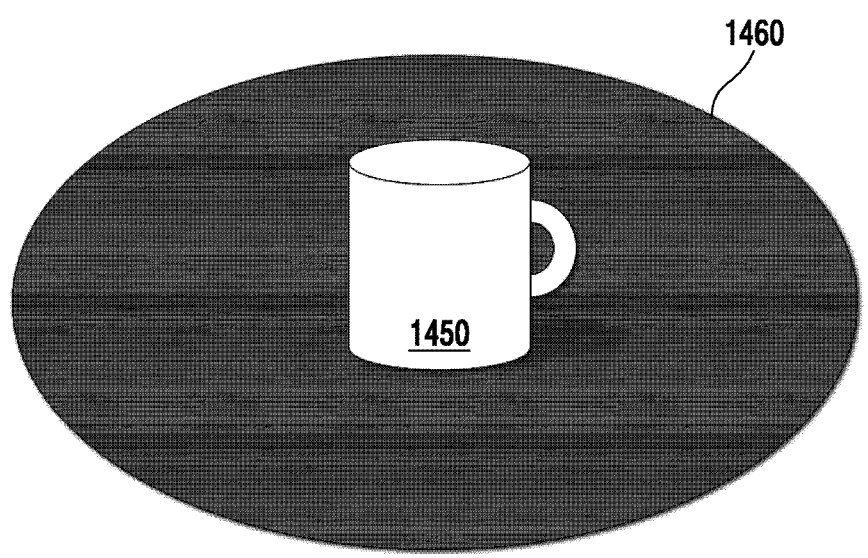
Figure 14D:
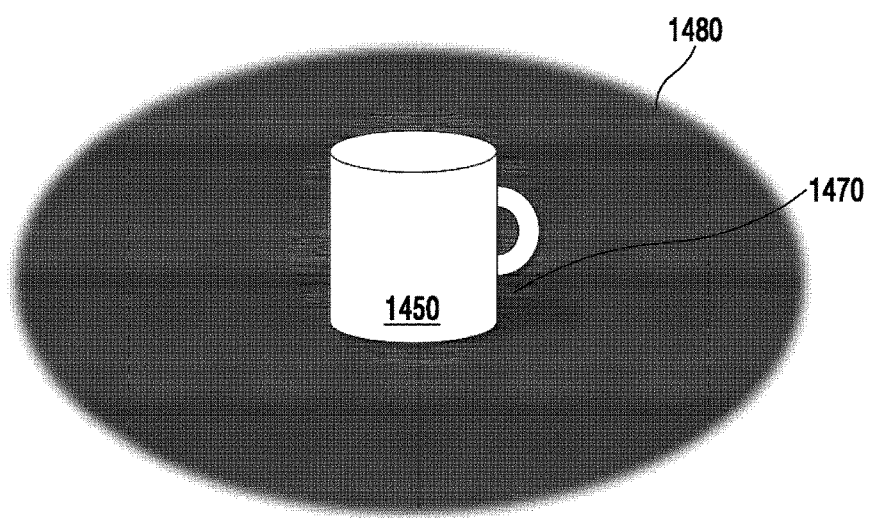

For example, in FIG. 14A, image data can include a main object image 1410 and a background image 1420. If the linear filter is determined based on the image of FIG. 14A, the electronic device can apply the linear filter to the acquired image of FIG. 14A, to generate a new image of FIG. 14B. The generated new image may include a clearly displayed region (1430) and a blur-processed region (1440). In FIG. 14C, image data can include a main object image 1450 and a background image 1460. If the circular filter is determined based on the image of FIG. 14C, the electronic device can apply the circular filter to the acquired image of FIG. 14C, to generate a new image of FIG. 14D. The generated new image may include a clearly displayed region (1470) and a blur-processed region (1480).

The center of a blur in the image to which the image filter is applied can be a focused point that is a criterion. A focus can be the center of the image or can be diversified based on a touch, etc. An image filtering method can perform blur processing around a focus position without performing the blur processing in the focus position.

Figure 15:
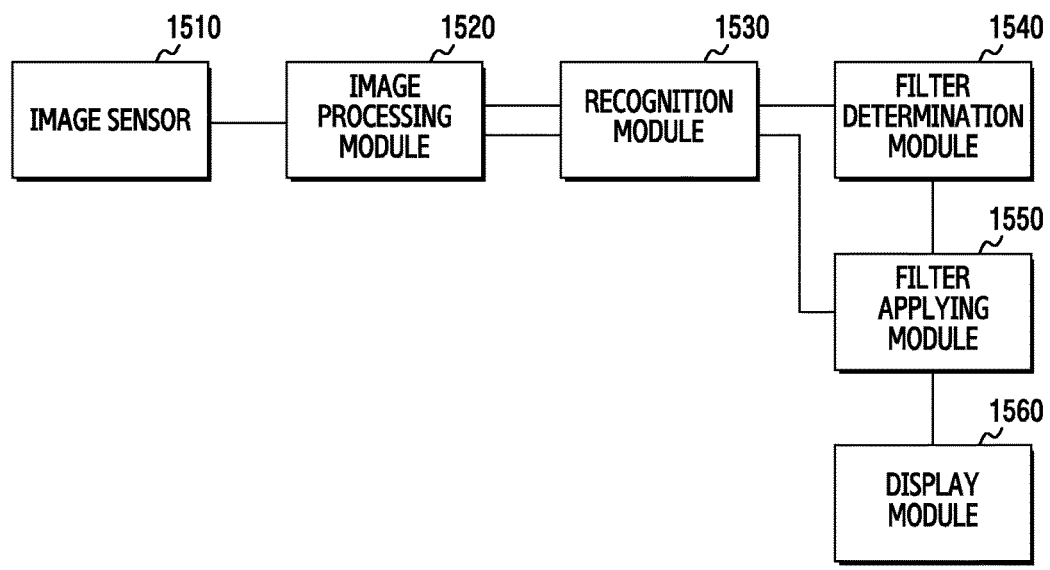
FIG. 15 is a block diagram illustrating an example image processing device according to various example embodiments of the present disclosure.

FIG. 15 is a block diagram illustrating an example image processing device according to various example embodiments of the present disclosure.

Referring to FIG. 15, the electronic device can set an image processing technique suitable to an acquired image, and can apply the set image processing technique to the acquired image, to generate a new image that a user desires. According to various example embodiments of the present disclosure, the electronic device can analyze the acquired image and set automatically the image processing technique. The image processing technique set in the electronic device can be used for selecting the image desired by the user. According to an example embodiment, the electronic device can set the image processing technique by analyzing the acquired image and a photographing environment (for example, a photographing condition such as a focus, light exposure, white balance, etc., a photographing posture, etc. dependent on a photographing angle of the electronic device, a motion, etc.).

The electronic device can set a camera module based on the set photographing condition, and acquire an image through the camera module. The photographing condition can include a photographing mode that uses the image processing technique according to various example embodiments of the present disclosure. The camera module can include an image sensor 1510. The image sensor 1510 can sense an object based on the photographing condition and convert the sensing result into an electrical image signal. Image data can include brightness information, color information, a signal for extracting distance information between the object and the electronic device, etc.

If the image processing technique is determined, the electronic device can drive the camera module and perform a photographing operation. An operation of the camera module can be an operation of displaying a preview image. The operation of displaying the preview image can be an operation of processing image data acquired in the image sensor 1510 and displaying the image data in a display module 1560.

The image sensor 1510 can be an image sensor (for example, 2-PD image sensor or 4-PD image sensor) having a structure of FIG. 8. The image sensor 1510 can be an image sensor that includes a pixel sensor and top surface phase difference sensors as in FIG. 11B. The image sensor 1510 can include a TOF image sensor, a structured-light image sensor, and/or an IR or ultrasonic measurement device.

According to an example embodiment, the image sensor 1510 can be a one-piece image sensor that implements as one device a construction outputting an image and a signal for extracting distance information. According to an example embodiment, the image sensor 1510 can be a stereo-structured image sensor in which each of an image sensor generating image data and a sensor (for example, depth sensor) generating a signal for extracting distance information are constructed independently.

According to an example embodiment, the image sensor 1510 can generate image data and signals for extracting distance information, at the same time. According to an example embodiment, the image sensor 1510 can generate the image data and the signals for extracting distance information, at different time.

According to an example embodiment, the image sensor 1510 can generate and map image data and signals for extracting distance information by pixel or by region. According to an example embodiment, the image sensor 1510 can generate and not to map the image data and the signals for extracting the distance information by pixel or by region.

An image processing module 1520 may include various image processing circuitry and program elements that can extract image data and distance information by processing an output from the image sensor 1510. The image processing module 1520 can include an image processing unit (e.g., Image Signal Processor (ISP)) and an information acquisition unit. The image processing unit can extract and process image data from a 3D image that is output in the image sensor 1510. The information acquisition unit can extract distance information between an object and the electronic device, by extracting signals for extracting the distance information, from the 3D image output in the image sensor 1510.

The image processing unit can perform an image pre-processing operation and an image post-processing operation. First, the image pre-processing operation can perform Auto White Balance (AWB), Auto Exposure (AE), Auto Focusing (AF) extracting and processing, lens shading correction, dead pixel correction, knee correction, etc., for images. The image post-processing operation can include color interpolation, Image Processing Chain (IPC), color conversion, etc. The color interpolation operation can perform a function of converting (e.g., full-color convert) pixels output in the image sensor 1510 into color including three colors, RGB. The IPC can perform noise reduction of color-interpolated images, gamma correction, luminance correction, etc. And, the color conversion operation can convert a corrected image (for example, raw data, Bayer data) into a YUV (or YCbCr) image.

The information acquisition unit can determine distance information between an object and the electronic device, based on pixel signals output in the image sensor 1510. For example, in case where the image sensor 1510 is an image sensor including a top surface phase difference sensor, the information acquisition unit can extract distance information between the object and the electronic device, based on signals of the top surface phase difference sensor. The information acquisition unit can generate photographing environment information of the electronic device. The photographing environment information can include photographing meta data (for example, exchangeable image file format (exif)), and/or photographing posture information of the electronic device. The distance information estimated in the information acquisition unit can be a depth map. The depth map information can be mapped with pixels of image data.

For example, the image sensor can be a 2-PD image sensor. The image processing unit can sum up or average sub pixel signals output in the 2-PD image sensor 1510, to generate a signal of a unit pixel. Thereafter, the image processing unit can pre-process and post-process unit pixel signals to generate image data. By determining a phase difference between a 1st sub pixel signal and 2nd sub pixel signal of the unit pixel, the information acquisition unit can estimate distance information. The phase difference between the 1st and 2nd sub pixel signals determined in the information acquisition unit can be used as distance information between the electronic device and the object.

According to an example embodiment, an image sensor of the camera module 510 can be a two-dimensional image sensor generating image data. If the image sensor is the two-dimensional image sensor, the image processing module 1520 can extract a contour line of image data and generate information similar with distance information. For example, if the image sensor is the two-dimensional image sensor, the information acquisition unit can extract a contour line of image data generated in the image sensor and generate information similar with distance information. The contour line of the image data can be extracted based on a change of color data, a brightness of the image, etc.

The recognition module 1530 may include various processing circuitry and program elements that can recognize configuration information (for example, a range of an object, a position of the object within an image, etc. based on distance information) of the object, based on image data and distance information (or contour line information of the image data) that are generated in the image processing module 1520. For example, the recognition module 1530 can recognize at least one object included within the image, based on distance information between the object and the electronic device output in the image processing module 1520. According to an example embodiment, the recognition module 1530 can estimate the configuration information of the object based on the distance information. According to an example embodiment, the recognition module 1530 can estimate the configuration information of the object based on the image data and the distance information.

Configuration information of an object that is recognized in the recognition module 1530 can be estimated based on a depth map. The configuration information of the object can include information such as a form of the object (for example, linear shape, circular shape, oval shape, etc.), depths of the objects, a size of the object, a position of the object, etc. The filter determination module 1540 may include various circuitry and program elements that can determine an image filter based on the configuration information of the object. The image filer can be filters of various forms as illustrated in FIG. 6A to FIG. 6E. The filter determination module 1540 can select one or a plurality of image filters based on the configuration information of the object.

The filter applying module 1550 may include various circuitry and program elements that can apply an image filter determined in the filter determination module 1540, to an image-processed acquisition image, to generate a new image. The display module 1560 can display the new image generated in the filter applying module 1560, as a preview image.

During the duration of analyzing a depth map and an image and determining configuration information (for example, object region) of an object, the electronic device can provide a notification of notifying that it is in course of image processing to the display module 1560. For example, the electronic device can apply an image processing effect (e.g., filter effect) which will be applied to a final photographing image or is similar with this, to a preview screen, and show the preview screen. By doing so, the electronic device can notify that it is now in processing, and concurrently display a process of generating the final result. For example, when applying an image filter to an acquired image, the electronic device can change a size of a preview image or change an attribute (for example, blur intensity and exposure value) of the preview image, thereby getting a user to feel the feeling of luxury without being bored.

According to an example embodiment, an image acquired in the image sensor 1510 can be a food image. For example, if food is included among objects, the image sensor 1510 can generate image data. The image data can include the food image and/or a signal for extracting distance information of food. The image processing module 1520 can process the food image data, and can generate distance information (e.g., depth map) based on the food image data. The food image can be expressed by a depth map of an object and posture information of the electronic device. For example, the depth map can be sensed and acquired by a 2-PD image sensor, or can be acquired by a top surface phase difference image sensor or a focus adjustment image sensor as well. The depth map can be obtained through a separate IR or ultrasonic measurement device as well. The posture information of the electronic device can be obtained through a sensor (for example, acceleration sensor and/or gyro sensor) installed in the electronic device.

The recognition module 1530 can recognize configuration information of a food image (e.g., a range (or size) of the food image, a position, a distance, etc.), based on depth map information or the food image and the depth map information. For example, the recognition module 1530 can recognize configuration information of food that is an object, based on acquired distance information that is capable of further including a depth map and/or posture information of the electronic device. The filter determination module 1540 can determine the most suitable image filter that will be applied to an object, based on the configuration information of the object (for example, food). The determined image filter can be one of a plurality of previously prepared image filters or a combination of two or more image filters. For example, the recognition module 1530 can extract a range of food that is an object and a position thereof, using the distance information (for example, depth map). The filter applying module 1540 can determine the most suitable image filter based on the extracted food range and position. For example, if the range of the food recognized in the recognition module 1530 is in a form in which it is long horizontally, the filter determination module 1540 can determine the linear filter of FIG. 14B. If the range of the food recognized in the recognition module 1530 is of a circular shape, the filter determination module 1540 can determine the circular filter of FIG. 14D.

The filter applying module 1550 can apply an image filter determined in the filter determination module 1540, to image data output in the recognition module 1530, to generate a new image. For example, the filter applying module 1550 can clearly display an image (for example, a region of a main object recognized in the recognition module 1530) of a region to which the image filter is applied, and can give a blur effect to a peripheral region other than this. The region to which the image filter is applied can be set based on an object constituent element that is recognized by distance information. For example, the center of a blur in the image filter can be a focused point that is a criterion. A focus can be the center of the image filter, or can be diversely set based on a touch, etc. According to an example embodiment, an image filtering method can perform blur processing around a focus position without performing the blur processing in the focus position. According to an example embodiment, the image filtering method can perform the blur processing in the focus position and around the focus position, at mutually different blur intensities.

The filter applying module 1550 can apply an effect different from a blur effect, to images of a region to which an image filter is applied. For example, the filter applying module 1550 can apply a lighting effect of giving a bright feeling or a macro effect of extending a specific region as well. For example, in case where a food range is of a circular shape, the filter determination module 1540 can determine a circular filter and a lighting filter. If so, the filter applying module 1550 can set a circular filter region to a region in which an object is located, and apply the lighting effect to an object image.

If a new image is generated in the filter applying module 1550, the display module 1560 can display the generated new image. The image displayed in the display module 1560 can be a preview image. While extracting distance information (e.g., depth map) and estimating an object region in order to apply an image filter, the electronic device can display that it is in processing through the display module 1560.

According to an example embodiment, while determining an object region that will apply an image filter, the electronic device can display on the display module 1560 a preview image having an effect similar with a new image that will be image-processed and generated. For example, when the electronic device displays the preview image, the electronic device can change and display a section to which the image filter (for example, linear filter, circular filter, etc.) will be applied, or can change and display a blur intensity and/or a brightness (for example, exposure value) of a peripheral image. The section to which the image filter is applied can be the entire image. The change of the section to which the image filter is applied can represent a change of a section applying processing (e.g., processing effect) within the image filter.

Accordingly, a user can check a process of dynamically changing an operation of analyzing food through a preview image and automatically setting an image filter effect and an excellent picture quality. According to an example embodiment, when the electronic device displays the preview image, the electronic device can display the preview image based on posture information of the electronic device. For example, the posture information of the electronic device can be acquired based on a sensor module, and can be provided from the recognition module 1530 to the filter applying module 1550. The filter applying module 1550 can apply an image filter to an acquired image in accordance with a photographing posture of the electronic device, thereby generating the preview image. The filter applying module 1550 can output the posture information of the electronic device to the display module 1560, together with the preview image. The display module 1560 can display the preview image that is based on the photographing posture of the electronic device, and can display associated photographing posture information.

In an example embodiment, the electronic device can change an application region (e.g., focus position) of an image filter in accordance with a user's selection, in course of displaying a preview image. For example, the electronic device can change the image filter and a central position by user's designation (e.g., touch, etc.) in the preview image. For example, if a filter region is set by a user (for example, if a user's drawing input is recognized), the recognition module 1530 can generate configuration information by the filter region that is set by the user. The filter determination module 1540 can set the image filter based on the filter region set by the user. In a preview mode, the filter applying module 1550 can apply the image filter set by the user, to generate a new image (for example, preview image). The user can set a focus point of the image filter, by a touch input, etc. If the focus point is set, the filter applying module 1550 can apply the set image filter, centering on the focus point that is set by the user.

If a user generates a capture command in course of displaying a preview image, the electronic device can store a new image generated in the filter applying module 1550, in a memory. According to an example embodiment, the electronic device can store all of image data acquired in the image processing module 1520 and the new image generated in the filter applying module 1550.

An electronic device according to various example embodiments of the present disclosure can include a camera module, a memory module, and a processor operatively coupled with the camera module and the memory module. The processor can acquire an image through the camera module, extract distance information based on the acquired image, determine an image processing technique for an object based on the extracted distance information, apply the determined image processing technique to the acquired image, and display the applied image.

The camera module can include an image sensor generating image data and a signal for extracting the distance information between the electronic device and the object.

The image sensor of the camera module can include an array of unit pixels, and the unit pixel can include two sub pixels. The processor can extract the distance information based on a phase difference between signals of the sub pixels of the unit pixel, and average the signals of the sub pixels to generate the image data.

The image sensor of the camera module can include a top surface phase difference sensor and pixel sensors, and the processor can extract the distance information based on a signal of the top surface phase difference sensor, and generate the image data based on signals of the pixel sensors.

The processor can extract the distance information based on the image, and recognize the object based on the distance information.

The image processing technique is an image filter, and the processor can extract configuration information of the recognized object, and determine the image filter based on the extracted configuration information, and apply the determined image filter to the acquired image data, to generate a new image.

While determining the image processing technique, the processor can display a preview image, and the preview image can be a preview image to which a dynamic filter being based on a blur, an exposure change, etc. is applied.

The electronic device can further include a sensor module sensing a posture of the electronic device, and the processor can display posture information of the electronic device in the new image that is displayed as the preview image.

The processor can select at least one filter among a linear filter, a circular filter, a lighting filter, a macro filter, and a selective focus filter in the configuration information, and apply the selected filter to the image data.

The generated new image can be an image that is blur-processed in its peripheral region with a criterion of a focus of the image filter. That is, the generated new image can be an image that is blur-processed in its peripheral region other than a focus position of the image filter.

The image filter can be an image filter applied to a food image.

At capture request, the processor can store the new image in the memory module.

The camera module can include an image sensor generating two-dimensional image data. The processor can extract contour line information of the object based on the image data, and recognize configuration information of the object based on the contour line information, and determine an image filter based on the configuration information, and apply the determined image filter to the image data.

Figure 16:
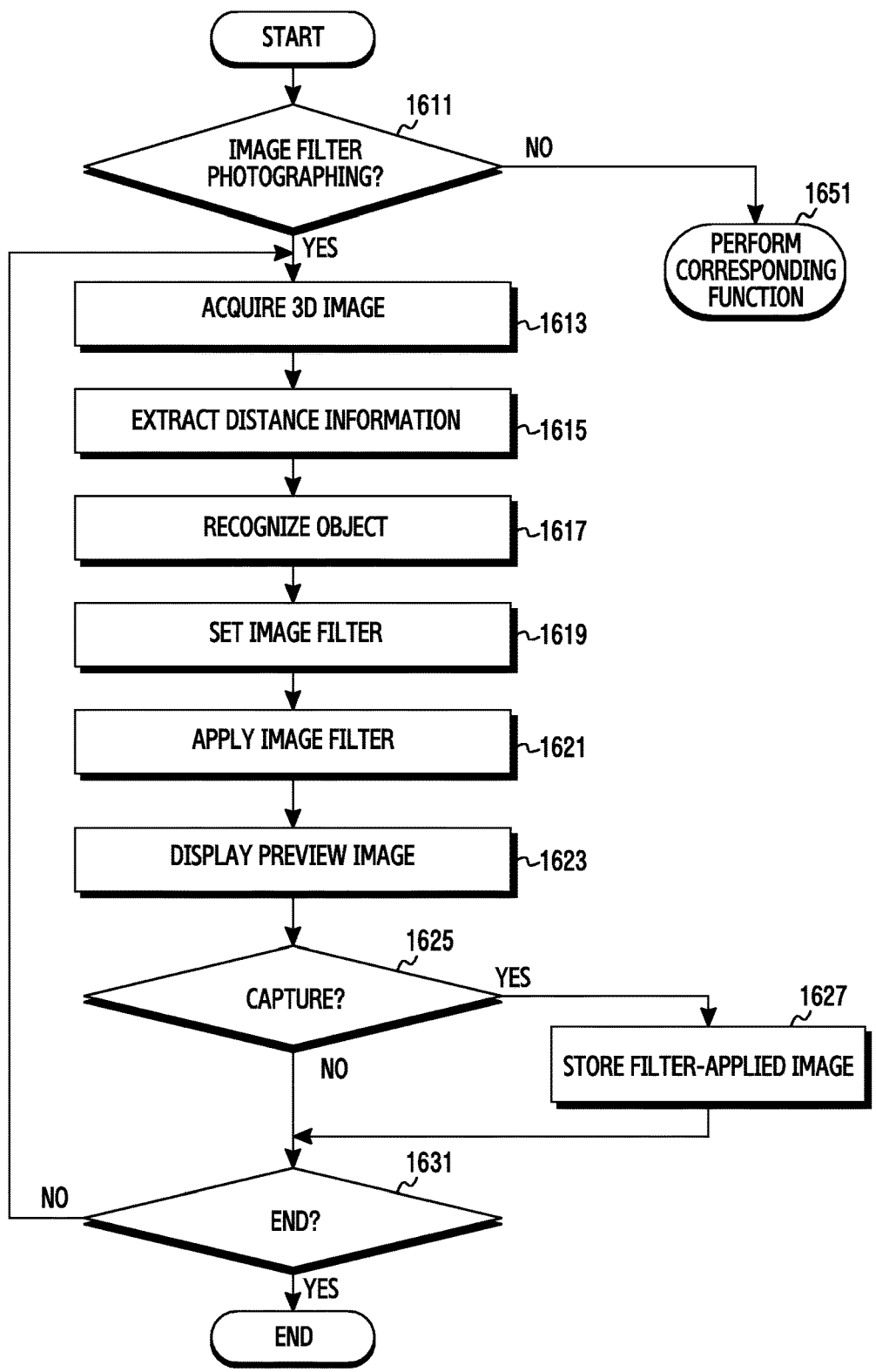
FIG. 16 is a flowchart illustrating an example method of processing an image in an electronic device according to various example embodiments of the present disclosure.

FIG. 16 is a flowchart illustrating an example method of processing an image in an electronic device according to various example embodiments of the present disclosure.

Referring to FIG. 16, in operation 1611, if a photographing command is generated, the electronic device (for example, processor 400 of FIG. 4) can set a photographing condition, and control a camera module to initiate photographing. The photographing mode can be a photographing mode of applying an image filter. If the photographing is initiated, an image sensor of the electronic device can convert an optical signal incident through a lens, into image data. The image data can include brightness information and color information of an image, and can include a signal for extracting distance information of an object.

In an example embodiment, the electronic device can acquire the image data and the signal for extracting the distance information, at the same time. For example, the image sensor can be a one-piece image sensor in which a sensor generating the image data and sensors generating a signal for extracting the distance information are integrated in one circuit. The electronic device can acquire the image data and the signal for extracting the distance information, at the same frame duration in the one-piece image sensor.

In an example embodiment, the electronic device can acquire the image data and the signal for extracting the distance information, at mutually different time. For example, the image sensor can be a stereo image sensor in which a sensor generating the image data and sensors generating the signal for extracting the distance information are constructed independently. The electronic device can individually acquire the image data and the signal for extracting the distance information in the stereo image sensor.

In an example embodiment, the electronic device may not map the image data and the signal for extracting the distance information. For example, in the image sensor, the sensor generating the image data and the sensor for extracting the distance information can be different in size (e.g., resolution). If the sensors are mutually different in size, the electronic device can map the image data and the signals for extracting the distance information, by the unit of pixel. The electronic device can map, by region, the image data and the signals for extracting the distance information. For example, the electronic device can split the sensor into segments and can map, by segment, the image data and the signals for extracting the distance information.

If the electronic device acquires the image data 1613, in operation 1615, the electronic device can extract the distance information of the object based on the three-dimensional image data. The distance information (e.g. depth map) of the object can be distance information between the object and the electronic device.

The image sensor can be an image sensor that cannot generate the signal for extracting the distance information. If so, in operation 1615, the electronic device can extract contour line information of the object. For example, in operation 1615, the electronic device can extract a contour line of the image data generated in the image sensor, and generate information similar with the distance information. The contour line of the image data can be extracted based on a contour line of an image, a change of color data, a brightness of the image, etc.

After extracting the distance information of the object, in operation 1617, the electronic device can recognize configuration information of the object based on the distance information of the object and/or the image data. For example, the configuration information of the object can include information such as a range (or size) of the object, a position within an image range, a depth of the object, etc. According to an example embodiment, the image data output in the image sensor and the signal for extracting the distance information of the object can be generated at mutually different time. If a synchronization of the time for generating a frame of the image data and a frame of the signal for extracting the object distance information is not made, in operation 1617, after the electronic device synchronizes the frame of the image data and the frame of the signal for extracting the object distance information, the electronic device can recognize configuration information of the object based on the image data and the signal for extracting the object distance information.

According to an example embodiment, the image data output in the image sensor and the signals for extracting the distance information of the object can be signals whose amplitudes (or resolutions) are not mapped with each other. If the two signals are not mapped by pixel or by region, in operation 1617, the electronic device can map the image data and the signals for extracting the object distance information, and recognize the configuration information of the object based on the mapped two signals. For example, if the resolution (or sensor size) of the image data is greater than the resolution of the signals for extracting the distance information, the electronic device can split a size of the image into segments, and map the signals for extracting the corresponding distance information to the image segments, and recognize the configuration information of the object based on the mapped two signals.

In operation 1619, the electronic device can determine an image processing technique based on the recognized configuration information of the object. The image processing technique can be an image filter. If the image filter is determined, in operation 1621, the electronic device can apply the determined image filter to the acquired image data, to generate a new image. In operation 1623, the electronic device can display the generated new image, e.g., a preview image on a display. The image displayed on the display can be a preview image.

The preview image can be an image in which an automatically set image filter is applied to the acquired image. If a photographing composition and focus are changed in accordance with a photographing posture (e.g., photographing angle and/or distance) of a user, in operation 1613, the electronic device can acquire an image changed by the photographing posture. If the image is changed, the electronic device can extract distance information based on changed image data. The electronic device can recognize configuration information of the newly recognized object based on the extracted distance information, and can change the image filter based on the recognized configuration information.

A user can check the preview image displayed on the display. While the electronic device recognizes the object configuration information and sets the image filter based on the generated image, the electronic device can display the preview image of an effect similar with the image to which the image filter is applied. For example, while the electronic device determines the image filter, the electronic device can display the preview image in various forms on a preview screen, by using a blur, an exposure change, etc. For example, the electronic device can apply a dynamic filter (e.g., blur applying, exposure change, etc.) having the feeling of change, to the preview screen, thereby visually providing the user with the image filter suitable to the object through processing.

In the case of displaying the preview image, the user can generate a drawing and/or a touch input. If the drawing input is sensed, the electronic device can set an image filter based on the drawing input, and display an image to which the set image filter is applied, as the preview image. If the touch input is sensed, the electronic device can set a focus position of the image filter based on a touch position, and display the preview image to which the set image filter is applied.

If the new image to which the desired composition and image filter are applied is displayed as the preview image, the user can generate a capture command. If the capture command is generated, in operation 1625, the electronic device can recognize this. In operation 1627, the electronic device can store the new image to which the image filter s applied. In operation 1627, the electronic device can store all of the new image to which the image filer is applied and an image acquired in the image sensor as well.

According to an example embodiment, the image acquired in the image sensor of the electronic device can be a food image. A user can set a food mode in a photographing menu. If the food mode is selected, in operation 1611, the electronic device can recognize the setting of the food mode, and can perform an operation of applying an image filter and generating an image. According to an example embodiment, in case where the electronic device uses a 2-PD image sensor, the electronic device can generate image data and a signal for extracting distance information. For example, a signal of sub pixels constructing a unit pixel can be the signal for extracting the distance information, and an average value (or sum-up) signal of the sub pixels can be the image data. The image sensor can convert an optical signal incident through a lens, and output the optical signal as image information. In operation 1613, the electronic device can acquire food image information. For example, an object can be food, and the food can have mutually different distances between the electronic device and the food. For example, in case where the food is contained in a container, the container and the food can have mutually different distances with the electronic device. And, even the food positioned within the container can have mutually different distance information. In operation 1615, the electronic device can extract the distance information from image data of the food. For example, if a food image is acquired as in FIG. 13A, the electronic device can extract a depth map of the food image as in FIG. 13B. In operation 1617, the electronic device can estimate configuration information (for example, a food range and/or position, a distance of the food image, etc.) of the food that will apply the image filter, based on the depth map (or depth map and image data).

For example, if food is included among objects constructing an image, the electronic device can estimate (or sense) a form of the food, position information, a position relationship between the food and the electronic device. Distance information extracted from the image can be expressed by a depth map of the image (for example, a food image within the entire image acquired) and posture information of the electronic device. For example, the depth map can be obtained through a 2-PD image sensor, or can be acquired through an image sensor including a top surface phase difference sensor as well. The depth map can be obtained through a separate IR or ultrasonic measurement device as well. The posture information of the electronic device can be acquired through a sensor installed in the electronic device.

In operation 1619, the electronic device can determine the most suitable image filter that will be applied to the object, based on the distance information (e.g., depth map and/or posture information of the electronic device). The image filter can be image filters of various forms, and can be stored in the memory. In accordance with the recognized configuration information (for example, a range of a food image, a position thereof, etc.) of the object, the electronic device can set one or more image filters among a previously prepared plurality of image filters.

According to an example embodiment, if a food image has a linear form, the electronic device can set the linear filter of FIG. 6A. According to an example embodiment, if the food image is contained within a container having a circular or polygonal form, the electronic device can set the circular filter of FIG. 6B. According to an example embodiment, in case where a relative change of a depth is smooth, the electronic device can apply the linear filter. According to an example embodiment, in case where the change of the depth is sudden, the electronic device can apply the circular filter with a criterion of a region of the depth. According to an example embodiment, if the food image is dark in brightness, the electronic device can set the lighting filter of FIG. 6C. According to an example embodiment, if the food image has a small size in the entire image, the electronic device can set the macro filter of FIG. 6D. According to an example embodiment, in case where the electronic device emphasizes the food image, the electronic device can set the selective focus filter of FIG. 6E.

According to an example embodiment, if a food image has a linear form and is dark in brightness, the electronic device can set the linear filter and the lighting filter, together. According to an example embodiment, if the food image is contained in a circular container and has a small size in the entire image, the electronic device can set the circular filter and the macro filter, together. According to an example embodiment, if the food image is contained in an oval container and the electronic device emphasizes the food image within the oval container, the electronic device can set the circular filter and the selective focus filter, together.

The electronic device can estimate a food image range in the entire image based on distance information, and set an optimal image filter that will be applied to the estimated food image. After setting the image filter, in operation 1621, the electronic device can apply the set image filter to the food image, to generate a new image. For example, the electronic device clearly display a region to which the image filter (for example, linear filter and/or circular filter) is applied, and blur-process peripheral region images other than the food image. For example, in case where the circular filter and the lighting filter are set, the electronic device can display to emphasize the food image by giving a lighting effect to food images of a range to which the circular filter is set. Images of a range to which the image filter is not set can be blur-processed. According to an example embodiment, when the electronic device applies the image filter to generate the new image, the electronic device can apply the lighting effect of giving a bright feeling or a macro effect of extending a specific region.

In operation 1623, the electronic device can display the new image to which the image filter is applied, as a preview image. The electronic device can display another image before providing the preview image to which the image filter is applied. For example, during the duration of analyzing a depth map and an image and determining a region (or object region) that will apply the image filter, the electronic device can provide a notification of notifying that it is in processing to a user. That is, before displaying the new image to which the image filter is applied, the electronic device can display a preview screen applying an effect that will be applied to a final photographing image or an effect (e.g., filter effect) that is similar to this. While the electronic device generates the new image applying the image filter, the electronic device can notify the user that it is now in image processing and concurrently show a process of generating a final result, thereby getting the user to feel the feeling of luxury of an image processing function without being bored. For example, when the electronic device applies the image filter, the electronic device can change a size (e.g., blur intensity and/or exposure value) of the food image, and display the food image. For example, the electronic device can dynamically display an operation of notifying analyzing the food image and automatically setting an image filter effect and an excellent picture quality, on the preview screen.

A method for operating in an electronic device according to various example embodiments of the present disclosure can include the operations of acquiring an image through an image sensor, extracting distance information from the acquired image, determining an image processing technique for an object based on the extracted distance information, applying the determined image processing technique to the acquired image, to generate a new image, and displaying the new image as a preview image.

The operation of acquiring the image can include the operations of acquiring image data, and acquiring a signal for extracting the distance information between the electronic device and the object.

The operation of determining the image processing technique can include the operations of recognizing configuration information of the object based on the depth map, and setting an image filter for processing an image based on the configuration information.

The operation of determining the image processing technique can include the operations of recognizing configuration information based on a contour line of the image data, and setting an image filter for processing an image based on the configuration information.

The operation of setting the image filter can set at least one filter among a linear filter, a circular filter, a lighting filter, a macro filter, and a selective focus filter based on the recognized configuration information of the object.

The operation of generating the new image can generate an image that is blur-processed in its peripheral region with a criterion of a focus of the image filter.

The operation of determining the image processing technique can further include the operation of displaying a preview image, and the operation of displaying the preview image can display a preview image to which a dynamic filter being based on a blur, an exposure change, etc. is applied.

According to various example embodiments, an electronic device including an imaging device can analyze an acquired image to automatically set an image processing technique, and apply the set image processing technique to the acquired image to generate a new image. If a photographing operation (for example, food photographing) applying the image processing technique is requested, the electronic device can extract configuration information of a main object from image data that is acquired through the imaging device, and can automatically set an image filter that will apply based on the extracted configuration information, and apply the image filter to the acquired image, and display an image in which the main object is emphasized.

Various example embodiments of the present disclosure have been described with reference to the accompanying drawings. It should be understood that the various example embodiments are intended to be illustrative, not limiting. Therefore, it will be apparent to one of ordinary skill in the art that various modifications, variations and alternatives will fall within the true spirit and full scope of the present disclosure as defined in the appended claims.

What is claimed is:

1. An electronic device comprising:
a display;
a camera module comprising an image sensor;
a memory module comprising a memory; and
a processor operatively coupled with the display, the camera module and the memory module, wherein the processor is configured to:
acquire image data through the camera module,
extract distance information based on the acquired image data,
based on the distance information, determine, within the acquired image data, an object,
determine, among a plurality of image processing techniques, an image processing technique for the object based on a shape of the object, and apply the determined image processing technique to the acquired image data to generate a new image and control the display to display the new image.

2. The device of claim 1, wherein the camera module comprises an image sensor configured to acquire the image data and to generate a signal for extracting the distance information of a distance between the electronic device and the object.

3. The device of claim 2, wherein the image sensor of the camera module comprises an array of unit pixels, each unit pixel comprising two sub pixels, and
the processor is configured to generate the signal for extracting the distance information based on a phase difference between signals of the sub pixels of the unit pixel, and to average the signals of the sub pixels to generate the image data.

4. The device of claim 2, wherein the image sensor of the camera module comprises a top surface phase difference sensor and pixel sensors, and
the processor is configured to generate the signal for extracting the distance information based on a signal of the top surface phase difference sensor, and to generate the image data based on signals of the pixel sensors.

5. The device of claim 2, wherein the processor is configured to extract the distance information based on the image data, and to recognize the object based on the distance information.

6. The device of claim 5, wherein the image processing technique comprises an image filter, and
the processor is configured to extract configuration information of the recognized object, to determine the image filter based on the extracted configuration information, to apply the determined image filter to the acquired image data, and to generate the new image.

7. The device of claim 1, wherein, the processor is configured to control the display to display a preview image in the course of determining the image processing technique, and
the preview image comprises a preview image to which a dynamic filter based on a blur and/or exposure change is applied.

8. The device of claim 6, wherein the processor is configured to select at least one of: a linear filter, a circular filter, a lighting filter, a macro filter, and a selective focus filter based on the configuration information, and to apply the selected filter to the image data.

9. The device of claim 8, wherein the generated new image comprises an image that is blur-processed in its peripheral region with a criterion of a focus of the image filter.

10. The device of claim 6, wherein the image filter comprises an image filter applied to a food image.

11. The device of claim 6, wherein, the processor is configured to store the new image in the memory module based on a capture request.

12. The device of claim 7, further comprising a sensor module configured to sense a posture of the electronic device, and
the processor is configured to control the display to display posture information of the electronic device in the new image that is displayed as the preview image.

13. The device of claim 1, wherein the camera module comprises an image sensor generating two-dimensional image data, and
the processor is configured to extract contour line information of the object based on the image data, to recognize configuration information of the object based on the contour line information, to determine an image filter based on the configuration information, and to apply the determined image filter to the image data.

14. A method for operating in an electronic device, the method comprising:
acquiring image data through an image sensor;
extracting distance information from the acquired image data;
based on the distance information, determining, within the acquired image data, an object,
determining, among a plurality of image processing techniques, an image processing technique for the object based on a shape of the object;
applying the determined image processing technique to the acquired image data, to generate a new image; and
displaying the new image.

15. The method of claim 14, wherein the acquiring the image data comprises:
acquiring the image data; and
acquiring a signal for extracting the distance information of a distance between the electronic device and the object.

16. The method of claim 14, wherein the determining the image processing technique comprises:
recognizing configuration information of the object based on a depth map; and
setting an image filter for processing an image based on the configuration information.

17. The method of claim 14, wherein the determining the image processing technique comprises:
recognizing configuration information based on a contour line of the image data; and
setting an image filter for processing an image based on the configuration information.

18. The method of claim 16, wherein the setting the image filter sets at least one of: a linear filter, a circular filter, a lighting filter, a macro filter, and a selective focus filter based on the recognized configuration information of the object.

19. The method of claim 14, wherein the generating the new image generates an image that is blur-processed in its peripheral region with a criterion of a focus of the image filter.

20. The method of claim 14, wherein the determining the image processing technique further comprises displaying a preview image, and
displaying a preview image comprises displaying a preview image to which a dynamic filter being based on a blur and/or exposure change is applied.

* * * * *